US010298629B2

(12) United States Patent
Stahl

(10) Patent No.: US 10,298,629 B2
(45) Date of Patent: May 21, 2019

(54) INTERCEPTING AND DECRYPTING MEDIA PATHS IN REAL TIME COMMUNICATIONS

(71) Applicant: IPALIVE AB, Sundbyberg (SE)

(72) Inventor: Karl Erik Stahl, Sundbyberg (SE)

(*) Notice: Subject to any disclaimer, the term of this patent is extended or adjusted under 35 U.S.C. 154(b) by 0 days.

(21) Appl. No.: 15/923,644

(22) Filed: Mar. 16, 2018

(65) Prior Publication Data

US 2018/0205769 A1 Jul. 19, 2018

Related U.S. Application Data

(62) Division of application No. 15/147,810, filed on May 5, 2016.

(60) Provisional application No. 62/157,359, filed on May 5, 2015.

(51) Int. Cl.
*H04L 29/06* (2006.01)
*H04M 7/00* (2006.01)

(52) U.S. Cl.
CPC ...... *H04L 65/1069* (2013.01); *H04L 65/1046* (2013.01); *H04L 65/608* (2013.01); *H04M 7/0066* (2013.01)

(58) Field of Classification Search
CPC ............. H04L 65/1069; H04L 65/1046; H04L 65/608; H04M 7/0066
See application file for complete search history.

(56) References Cited

U.S. PATENT DOCUMENTS

| | | | |
|---|---|---|---|
| 2004/0122976 A1 | 6/2004 | Dutta et al. | |
| 2014/0095724 A1* | 4/2014 | Yoakum | H04L 29/08054 709/228 |
| 2014/0122976 A1* | 5/2014 | Wang | H03M 13/1515 714/776 |
| 2015/0006611 A1 | 1/2015 | Johnston et al. | |

FOREIGN PATENT DOCUMENTS

| | | |
|---|---|---|
| DE | 10 2014 108 888 | 12/2014 |
| WO | 2013/108121 | 7/2013 |

OTHER PUBLICATIONS

Initial Search Report and Invitation to Pay Additional Fees dated Sep. 7, 2016 in corresponding International Application No. PCT/IB2016/000713, 8 pages.
International Search Report dated Nov. 30, 2016 in corresponding International Application No. PCT/IB2016/000713, 6 pages.
Written Opinion of the International Searching Authority dated Nov. 30, 2016 in corresponding International Application No. PCT/IB2016/000713, 17 pages.

* cited by examiner

*Primary Examiner* — Siming Liu
(74) *Attorney, Agent, or Firm* — Rao Deboer Osterrieder, PLLC; Erik J. Osterrieder

(57) ABSTRACT

This disclosure pertains to establishing or reestablishing media streams for interception and decryption of media traffic in a service using fingerprint to protected against man in the middle attacks.

24 Claims, 14 Drawing Sheets

INTERCEPTING AND DECRYPTING MEDIA PATHS IN REAL TIME COMMUNICATIONS

CROSS-REFERENCE TO RELATED APPLICATIONS

This application is a divisional of and is based upon and claims the benefit of priority to US Non-Provisional Application Serial No. 15/147,810 filed May 5, 2016, which is based upon and claims the benefit of priority to US Provisional Application Serial No. 62/157,359 filed May 5, 2015, the disclosures of which are incorporated herein by this reference in its entireties.

BACKGROUND

1. Field

This method, telecommunication device, system or software module relates generally to the field of telecommunication.

2. Description of the Related Art

The current global telephone network, the PSTN (Public Switched Telephone Network), is built for voice communication of limited bandwidth (only 3.5 kHz). Broadband networks, e.g. the Internet, can also be used for real-time person-to-person communication, e.g. voice communication, often called VoIP (Voice over Internet Protocol). The Internet transports data between endpoints, regardless of the data content or the application and is therefore called a transport network.

VoIP, or more generally Real-Time Communication (RTC), is also used for multimedia communication beyond the Plain Old Telephony Service (POTS), e.g. video, presence and instant messaging. There are standards and drafts for RTC, often defined by the Internet Engineering Task Force (IETF).

Session Initiation Protocol (SIP, RFC 3261) is widely used protocol for RTC. RFCs (Request For Comments) are Internet standards defined by the IETF. Web Real-Time Communication (WebRTC) is RTC built into web browsers under development and standardization by IETF and World Wide Web Consortium (W3C).

RTC protocols are used to establish media streams such as voice and video, between endpoint devices, often providing telephony-like functions and services. They often define the call setup procedure, that is how a call is initiated, done and completed.

A data communication network is typically a packet switch network like the Internet, forwarding packets of data to destinations specified by the address of the packets. The packets typically also contain the source address from which it was sent. Data packets may be messages containing requests, responses, or data representing documents, files or media like movies and voice and are exchanged between endpoints.

A data communication network may also include private segments, intranets, or Local Area Networks (LANs) that communicate with the global network through a Network Address Translator (NAT) or firewall, which often are combined and just called either NAT or firewall or sometimes access router.

In a packet switched network, traffic is data packets being sent and received.

Real-time traffic is streams of voice or other media like video. Such media streams are used by telephony-like services or calls over a network.

A media path transports such media stream over a network, which may consist of several network segments of different types.

Endpoints such as various devices, clients and servers have one or several network interfaces like Ethernet, WiFi or LTE radio interfaces, with which they connect to network access points.

An address in a network may be a number (like an IPv4 or an IPv6 address) or a symbolic address, like a Fully Qualified Domain Name (FQDN), that is further resolved into a number address, e.g. by a Domain Name System (DNS) service.

Such addresses may also be further specified by port numbers, to indicate a protocol being used or simply used as an extension to the address types exemplified above (e.g. an IPv4 address with specified port 132.64.75.1:1234), which in this context may be one form of a network address in general.

Endpoints such as various devices, clients and servers have one or several addresses in a network, at which they can send or receive traffic. Typically, the address to an endpoint is dependent of network interface of the endpoint and the access point of the network.

A server is a network device accessed by clients. The client can be a program on a computer or a device connected to the network.

An application server is a server offering a service or a function to users.

Network access points have different locations and can use different fixed access technologies such as Ethernet, ADSL modems, cable modems, fiber and various wireless and mobile technologies such as WiFi, 3G, 4G, LTE and more.

In addition to general network segments like the public Internet and private intranets or LANs, there are application specific network segments, e.g. telephony type of networks that carry signaling and media for voice and maybe for video, but not general data traffic. Voice over IP (VoIP) may be either over a general data network like the Internet or Over The Top (OTT) as it is called in the mobile world, or over an application specific network segment like Voice over LTE (VoLTE) that uses IP networks.

Signaling are typically messages in signaling channels between endpoints, proxies and servers over network segments. The signaling over a signaling channel can be interrupted, e.g. when loosing wireless coverage, changing interface of a device or changing access point of a network segment, but can thereafter be recovered to reestablish signaling connectivity.

Firewalls and NATs typically block real time communication, an issue that either is resolved by Session Border Controllers (SBCs) at the edge of the private network or by methods or protocols such as e.g. Session Traversal Utilities for NAT (STUN, RFC 5389), Traversal Using Relays around NAT (TURN, RFC 5766) and Interactive Connectivity Establishment (ICE, RFC 5245).

A TURN server relays traffic between two network addresses and is an example of a relay server. A TURN server can be discovered by an RTC endpoint and in a sealed network segment it then has to be used for RTC media traffic outside the sealed network segment.

SBCs also implement security and interoperability functions for VoIP and RTC and are often used for connecting Internet Telephony Service Provider's (ITSP's) VoIP services to IP-PBXs, also called SIP trunking.

An IP-PBX is an Internet Protocol (IP) Private Branch eXchange (PBX).

Call centers are most often based on IP-PBXs or Unified Communications (UC) solutions receiving calls via an ITSP's SIP Trunk. These calls are typically initiated via toll free numbers (800 numbers in the US) from the telephony network.

PBX or UC functionality can be Interactive Voice Response (IVR), Queues, Voice and Video mail.

Instant Messaging (IM), presence, screen sharing and group calls are other RTC functions.

A protocol is a set of rules defining language and methods of communication.

An example is the Session Description Protocol (SDP, RFC 4566) that describes which media and codecs to use and where the media should be sent. Such real-time communication can be offered by one endpoint to another endpoint that can answer with its willingness and media capabilities to set up media communication session between the endpoints. That is an Offer and Answer protocol (O/A protocol).

The O/A protocol typically determines the media types, e.g. voice and video specifying which codec to use.

Such O/A protocol may also suggest methods and candidates how to set up the media path between endpoints, as e.g. defined by the ICE protocol for NAT traversal.

A media path is typically set up for the purpose of real-time communication, while the wider term communication path refers to a direct or indirect channel for transferring data that may or may not represent media.

A media endpoint is an endpoint to which a media path over a network is coupled to allow media streams to flow, typically containing real-time traffic representing voice or video.

An established media path between media endpoints that is set up again is said to be reestablished.

A media endpoint has peer-to-peer media capability if it can set up a media path directly to another media endpoint with or without going through a server, e.g. a TURN server. Mutual peer-to-peer media capability means that two endpoints are compatible and can set up a direct media path between each other.

The Session Initiation Protocol (SIP) is used to find users and set up calls between SIP clients, their real-time communication devices, e.g. hardware SIP phones or software SIP phones being a software application on a computer. SIP is a signaling protocol using registrar and proxy servers to find users and further uses the SDP O/A protocol to establish a media channel between SIP client endpoints. A SIP client typically includes the SIP user agent, interfacing users to the SIP proxy.

Web Real Time Communication (WebRTC) is a set of recommendations and protocols under standardization for extending web browsers to allow real-time communication between them, WebRTC does not specify the signaling for finding users, but allows web browsers connected to the same web server to establish a media channel for real-time communication between them, using the SDP O/A protocol. WebRTC uses the ICE protocol, including STUN and TURN, to set up a media path between the WebRTC media endpoints.

RTC devices including media endpoints may therefore be implemented in WebRTC browsers, which retrieve their program code (in HTML and Java Script) from web servers.

With WebRTC, the media streams are encrypted using the DTLS-SRTP protocol and are protected against "man in the middle" attacks. The protection involves exchange of fingerprints (digital signatures of the certificates used for the encryption key generation) between the parties over another channel or path than used for generating the encryption keys. This means that the media traffic cannot be decrypted by just intercepting the media path or the signaling path.

A web browser is a program running on computers or smartphones for accessing the World Wide Web (the web), a service on the Internet or an Intranet implemented on a web server, Software applications are other programs running on computers or smartphones.

A web server may transfer program code, typically Java Script, to a web browser for execution therein, which is a technology used with WebRTC.

A HyperText Transfer Protocol (HTTP) URL (or simply "a link") identifies a web resource and specifies the acting upon executing it. For example, a URL may refer to the web resource /wiki/Main_Page whose related program code is obtainable via HTTP from a server whose domain name is example.org.

Executing a HTTP URL in a WebRTC browser, may initiate a call to be setup from the web server being addressed, which is a useful feature of the emerging WebRTC technology. Such URL may contain a telephone number and other information of the call to setup, e.g. a limitation in time for when the URL can be used for calling.

WebRTC HTTP URLs may be long and obscure and there are services shortening links, such as Bitly, using its short domain name bit.ly after a unique string that represents a long HTTP URL that Bitly has stored, so when a URL is executed in a web browser, it goes to Bitly that redirects it to the full long web link.

Such WebRTC click-to-call link can be generated by and stored in a WebRTC server that will be called when clicked in a browser. A shortened link, e.g. consisting of a unique string followed by the domain name of the server, would be passed to the user that is intended to execute it in a WebRTC browser. Time limiting can be implemented by encrypting the last valid time or simply by only storing the link translation in the WebRTC server for as long as it is valid.

Click-to-call links, or buttons executing such links, can also be used on Web sites and are then often context-sensitive, i.e. they can carry information of whom that clicked the link, which selections that may have been made, when it was clicked and from where it was clicked.

Some browsers support WebRTC, some do not, some do it better than others. It may therefore be advantageous to define and identify a specific domain name extension, e.g. wrtc in wrtc.company.com, in a WebRTC HTTP URL link for invoking WebRTC functionality, that otherwise may not be available.

Gateways are used to convert between different network segments or protocols to allow a service to function between more users.

Clients access their servers when needed, but RTC clients, e.g. SIP or WebRTC clients, also need to maintain a connection to their server for incoming signaling, for an incoming call or for reestablishing a media path for an ongoing call.

A media endpoint typically knows between which addresses a media path, carrying media traffic (a media stream) is setup and can thereby determine if it is dependent on a particular address change.

Smartphones, that are mobile devices, may go to sleep when not in use to save remaining battery time, but can often be woken up to e.g. receive a message or prepare for an incoming VoIP call by so called push notifications from a centralized push notification server.

VoIP, softclients, smartphones and extended communication possibilities and functionality with RTC, are making the Graphical User Interface (GUI) of RTC clients important. One way of improving the GUI is to organize contacts (persons or users) in separate lists based on the call state (e.g. idle, active, in a group call, on hold, in queue n, in transfer, incoming unanswered calls etc.), where each contact (in a list, or single) have an expandable action menu listing currently available selections (e.g. Call, Hang-up, Transfer, Hold, Connect in conference, Mute/Un-mute Video, Mute/Un-mute Voice, Send message, Change presence and possibly also administrative tasks). Such menu can be expanded through a small symbol, e.g. the three vertical dots symbol or the menu lines symbol, commonly used by smartphones, at the line of the contact.

In a real time media channel, Dual Tone Multi Frequency (DTMF) digits can be transferred either encoded as audio or out-of-band in data packets. DTMF defined symbols are 0, 1, 2, 3, 4, 5, 6, 7, 8, 9, #, *, A, B, C and D.

SUMMARY

With modern networks and telecommunication devices, servers and gateways having processors coupled to memory, telephony is evolving to real time communication, RTC, and a call is setup up via a signaling channel over the network followed by establishment of media paths over the network where the RTC media traffic, like voice or video, can flow between media endpoints.

In one aspect, handover of calls is implemented in an environment where the RTC device, like smartphone or laptop computer, may have several network interfaces, like W-Fi, LTE wireless or wired Ethernet, and may access the network from different access points at different network segments, like the Internet, intranets or telephony types of network segments, by creating a connection identity when the RTC device connects to its server, followed by monitoring and testing both the signaling channel and the media path, and when the access to the network changes, recovering connectivity of the signaling channel and establishing or reestablishing media paths when needed.

In another aspect, a need for reestablishing media paths is determined by various changes of addresses used for the signaling channel and media path.

In another aspect, a frequency of sending messages to monitor the signaling channel is adapted to whether a call is ongoing, or whether there are NAT or firewall openings that need to be kept alive, to save processor capacity and power consumption.

In another aspect, gateways are formed for connecting calls between endpoints that are incompatible regarding signaling or media, or for connecting calls over network segments that are incompatible regarding signaling or media.

In another aspect, media paths are established or reestablished through intercepting gateways by including a proxy and a media server, for monitoring, analyzing and recording purposes.

In another aspect, media paths are established or reestablished through intercepting gateways by including a TURN server, for monitoring, analyzing and recording purposes.

In another aspect, media paths over network segments of different types are avoided by establishing or reestablishing a direct media path for richer media, improved media quality, lower network load or lower cost calls.

In another aspect, a system for communication over a network having network segments of different types uses two or more RTC devices.

In another aspect, a system for communication over a network where the user agents coupled to the RTC devices are implemented in the server or interconnecting servers.

In another aspect, interconnecting servers use the SIP protocol and the SIP user agents coupled to the RTC devices are implemented in the server instead of the in the RTC devices, which would be the case if the RTC device in itself was a SIP client.

In another aspect, implementing compatibility with endpoints or with network segments, in the RTC device by deviating from its defined protocols, instead of in a gateway, to offload the gateway.

In one aspect, a method for establishing or reestablishing a media path between endpoints with one or more network interfaces of different types connected to network access points at different types of network segments, to implement handover of calls is conducted by providing a Real Time Communication device comprising a first media endpoint, a second media endpoint and a server, each of the RTC device, the second media endpoint and the server having a memory and a processor coupled to the memory, making the server reachable at addresses from access points at the network segments, where the RTC device and the second media endpoint will be used, arranging at least one network interface of the RTC device that is connected to some network access point to send and receive messages between the RTC device and the server, and configuring the RTC device and the second media endpoint to have peer-to-peer media capability by using an Offer and Answer protocol (O/A protocol) to establish and reestablish a media path between the RTC device and the second media endpoint, then, after establishing a connection between the RTC device and the server, creating a unique connection identity that is shared between the RTC device and the server to allow a non responding connection to be identified and recovered, and when the network access point or the network interface used by the RTC device for connecting to the server may change or the access point or the network interface used for a media path, may change during a call, collecting, by the RTC device, addresses to the server from the access points at the network segments.

In another aspect, the RTC device may collect the addresses to the server from the access points at the network segments by one or more of retrieving one or more addresses to the server from a call setup procedure, retrieving one or more addresses to the server as a source address of a message from the server, receiving a message from the server conveying one or more addresses to the server, using DNS or other database look up of addresses to the server, and storing a list of predetermined addresses to the server, sending messages repeatedly, by the RTC device, to an address of the server and, if not receiving a response, then trying other collected addresses to the server until receiving a response and recovering signaling connectivity by continuing sending messages to the address from which the response was received, after recovering signaling between the RTC device and the server, presenting the connection identity, by the RTC device, to the server for recovering the specific connection, to be able to receive calls or to use the O/A protocol to establish or reestablish a media path between the RTC device and the second media endpoint, determining a need for media path reestablishment, by the RTC device, by monitoring or being informed of whether the media path needs to be reestablished, and if the media path needs to be reestablished, initiating reestablishment of the media path, by the RTC device, between the RTC device and the second media endpoint, by using the O/A protocol via the server.

In another aspect, the method for establishing or reestablishing a media path between endpoints with one or more network interfaces of different types connected to network access points at different types of network segments includes determining a need for media path reestablishment, by the RTC device, by occurrence of an event of changed addresses or media path conditions by one or more of the RTC device detecting or being informed by a message from the server that its address used for connecting to the server has changed and the media path being dependent of that changed address, the RTC device receiving a message from the server where a destination address of the message has changed compared to an earlier message and the media path being dependent of the changed address, the RTC device detecting that its address for the media path has changed, the RTC device being informed by a message from the second media endpoint via the server that the address used for the media path by the second media endpoint has changed, and the RTC device detecting or being informed that the traffic in either direction of the media path between the RTC device and the second media endpoint has stopped or deteriorated.

In another aspect, the method for establishing or reestablishing a media path between endpoints with one or more network interfaces of different types connected to network access points at different types of network segments includes adapting, by the RTC device, a frequency of sending messages repeatedly to the server depending on whether a call is ongoing, or whether there are NAT or firewall openings that need to be kept alive.

In another aspect, the method for establishing or reestablishing a media path between endpoints with one or more network interfaces of different types connected to network access points at different types of network segments includes integrating the second media endpoint with the server forming a gateway for connecting calls to endpoints that are incompatible with the RTC device regarding signaling or media, or for connecting calls over network segments that are incompatible regarding signaling or media, when a protocol used by the RTC device requires media encryption and encryption keys are negotiated over the media path by the media endpoints and has protection against man in the middle attacks by checking a fingerprint only available to the server through a signaling channel.

In another aspect, a method for establishing a media path between endpoints for intercepting and decrypting Real Time Communication media traffic between an RTC device and an RTC service using a communication protocol, where the media traffic is protected against man in the middle attacks using a fingerprint, for monitoring, analyzing and recording purposes, is conducted by providing a Real Time Communication device comprising a first media endpoint, a second media endpoint, an RTC server and an intercepting gateway, each of the RTC device, the second media endpoint, the RTC server and the intercepting gateway having a memory and a processor coupled to the memory, integrating, with the intercepting gateway, a proxy for the communication protocol used by the RTC service and a media server, each of the proxy and the media server having a memory and a processor coupled to the memory, establishing the RTC media path between the RTC device and the media server and between the media server and the second media endpoint, by the proxy rewriting messages, arranging the fingerprint, by the proxy rewriting the messages, for the interception, decryption and transferring of the RTC media traffic by the media server, and configuring the RTC device to use said proxy for the communication protocol used by the RTC service.

In another aspect, a method for establishing a media path between endpoints for intercepting and decrypting Real Time Communication media traffic between an RTC device and an RTC service using a TURN protocol, where the media traffic is protected against man in the middle attacks using a fingerprint, for monitoring, analyzing and recording purposes, is conducted by providing a Real Time Communication device comprising a first media endpoint, a second media endpoint, an RTC server and an intercepting gateway, each of the RTC device, the second media endpoint, the RTC server and the intercepting gateway having a memory and a processor coupled to the memory, integrating a TURN server having a memory and a processor coupled to the memory with the intercepting gateway, establishing the RTC media path between the RTC device and the TURN server and between the TURN server and the second media endpoint, by configuring the RTC device or the RTC service to use the TURN server, or by one of the media endpoints discovering the TURN server in a sealed network segment, and conveying the decryption key for the RTC media traffic to the intercepting gateway, by the first media endpoint or by the second media endpoint, for decrypting the RTC media traffic passing the intercepting gateway.

In another aspect a method for establishing or reestablishing a media path between endpoints with peer-to-peer media capability, connected over a network with gateways between network segments of different types, to achieve a direct media path for richer media, improved media quality, lower network load or lower cost calls, is conducted by providing a Real Time Communication device comprising a first media endpoint, a second media endpoint and interconnecting servers, each of the RTC device, the second media endpoint and the interconnecting servers having a memory and a processor coupled to the memory, configuring the RTC device and the second media endpoint to have peer-to-peer media capability by using an Offer and Answer protocol (O/A protocol) to establish and reestablish a media path for media traffic of different types, attempting to set up a call between the RTC device and the second media endpoint, not knowing whether they have mutual per-to-per media compatibility or whether the interconnecting servers convey the O/A protocol between the RTC device and the second media endpoint to establish a direct media path between the RTC device and the second media endpoint, establishing, by the RTC device, a first signaling channel to the interconnecting server that the second media endpoint is connected to, and receiving, by the RTC device, an indication of mutual peer-to-peer media compatibility, then invoking a process for direct media path establishment or reestablishment.

In another aspect, the process for direct media path establishment or reestablishment is invoked by one or more of requesting, by the RTC device, establishment of a direct media path for the call, using the O/A protocol, which may be compressed, through an end-to-end signaling channel between the RTC device and the second media endpoint, requesting, by the RTC device, establishment of a direct media path for the call, using the O/A protocol, which may be compressed, through an established first media path, between the RTC device and the second media endpoint, and sending, by the RTC device, information about the call setup and a network address of the interconnecting server that the RTC device is connected to, which may be in form of a HTTP URL, which may be shortened, compressed, limited in time or DTMF encoded, through an established first media path or through an end-to-end signaling channel, for establishment of a direct media path for the call using the O/A protocol, and receiving, by the second media endpoint, an indication of mutual peer-to-peer media compatibility, and then invoking a process for direct media path establishment or reestablishment.

In another aspect, the process for direct media path establishment or reestablishment is invoked by one or more of requesting, by the second media endpoint, establishment of a direct media path for the call, using the O/A protocol, which may be compressed, through an end-to-end signaling channel between the RTC device and the second media endpoint, requesting, by the second media endpoint, establishment of a direct media path for the call, using the O/A protocol, which may be compressed, through an established first media path, between the RTC device and the second media endpoint, and sending, by the second media endpoint, information about the call setup and a network address of the interconnecting server that the second media endpoint is connected to, which may be in form of a HTTP URL, which may be shortened, compressed, limited in time or DTMF encoded, through an established first media path or through an end-to-end signaling channel, for establishment of a direct media path for the call using the O/A protocol.

In another aspect, the second endpoint is another RTC device or gateway.

In another aspect, the system for communication over a network includes two or more RTC endpoints.

In another aspect, a client side of the system is implemented by a telecommunication device.

In another aspect, a server side of the system, which may be part of a Session Border Controller is implemented by a telecommunication device.

In another aspect, the device for telecommunication incorporates and can send a program to a client.

In another aspect, the device for telecommunication is a web server.

In another aspect, the client or server side of the system is implemented by a software module in a web browser or as an application for smartphones, tablets, laptop or personal computers or computer servers, or in a telecommunication device comprising a processor for executing a program.

In another aspect, the software module includes a program performing a function, such as sending messages (164) to endpoints, which may be shortened, compressed, limited in time or DTMF encoded, through a media path (146), receiving messages (164) from an endpoint, which may be shortened, compressed, limited in time or DTMF encoded, through a media path (146), establishing an additional alternative media path, which quality or other metric is evaluated, before using the alternative media path for the media traffic, communicating real time using the Session Initiation Protocol (SIP), communicating real time using the Web Real Time Communication (WebRTC) protocol, establishing media paths between endpoints using the Interactive Connection Establishment (ICE), establishing media paths using the Session Traversal Utilities for NAT (STUN) protocol, establishing media paths using the Traversal Using Relays around NAT (TURN) protocol, storing knowledge, from a self learning process, whether endpoints or network segments have mutual per-to-per media compatibility, generating a WebRTC HTTP URL click-to-call link, that may be time limited and can be stored in a WebRTC server and sent in a shortened form to a WebRTC browser user, executing a WebRTC HTTP URL link, that may be time limited, that is stored in a WebRTC server and received in a shortened form from a WebRTC browser user, identifying a specific domain name extension, e.g. wrtc in wrtc.company.com, in a WebRTC HTTP URL link for invoking WebRTC functionality that otherwise may not be available, organizing contacts in lists based on the call state, in a graphical user interface for RTC clients, representing an expandable action menu for a single contact in a graphical user interface for RTC clients, by the small three vertical dot symbol or the menu lines symbol used in mobile applications, waking up smartphones or other mobile devices to receive incoming calls by push notifications, integrating Private Branch exchanges (PBX) functionality, integrating Session Border Controller (SBC) functionality, integrating Unified Communications (UC) solution functionality, integrating WebRTC to SIP gateway functionality, integrating call center or contact center functionality, generating context sensitive click-to-call links, executing context sensitive click-to-call links, connecting call agents using WebRTC browsers as clients, and providing Instant Messaging (IM), presence, screen sharing and group call functions.

In another aspect, user agents coupled to the RTC devices of the system are implemented in the server, interconnecting servers or RTC server.

In another aspect, the interconnecting servers use the SIP protocol between each other and SIP user agents coupled to the RTC devices are implemented in the interconnecting servers.

In another aspect, the server or interconnecting server is combined with a gateway or intercepting gateway.

In another aspect, when the defined O/A protocol for the media endpoints is incompatible with an endpoint or network segments, implementing in the media endpoints, by deviating from the defined O/A protocol, an O/A protocol that is compatible with the endpoints and the network segment to communicate with, to offload the gateway to enable communication, and when the defined media path capabilities for the media endpoints are incompatible with an endpoint or network segments, implementing in the media endpoints, by deviating from the defined media path capabilities, media path capabilities that are compatible with the endpoints and the network segment to communicate with, to offload the gateway to enable communication.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use of the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 5:
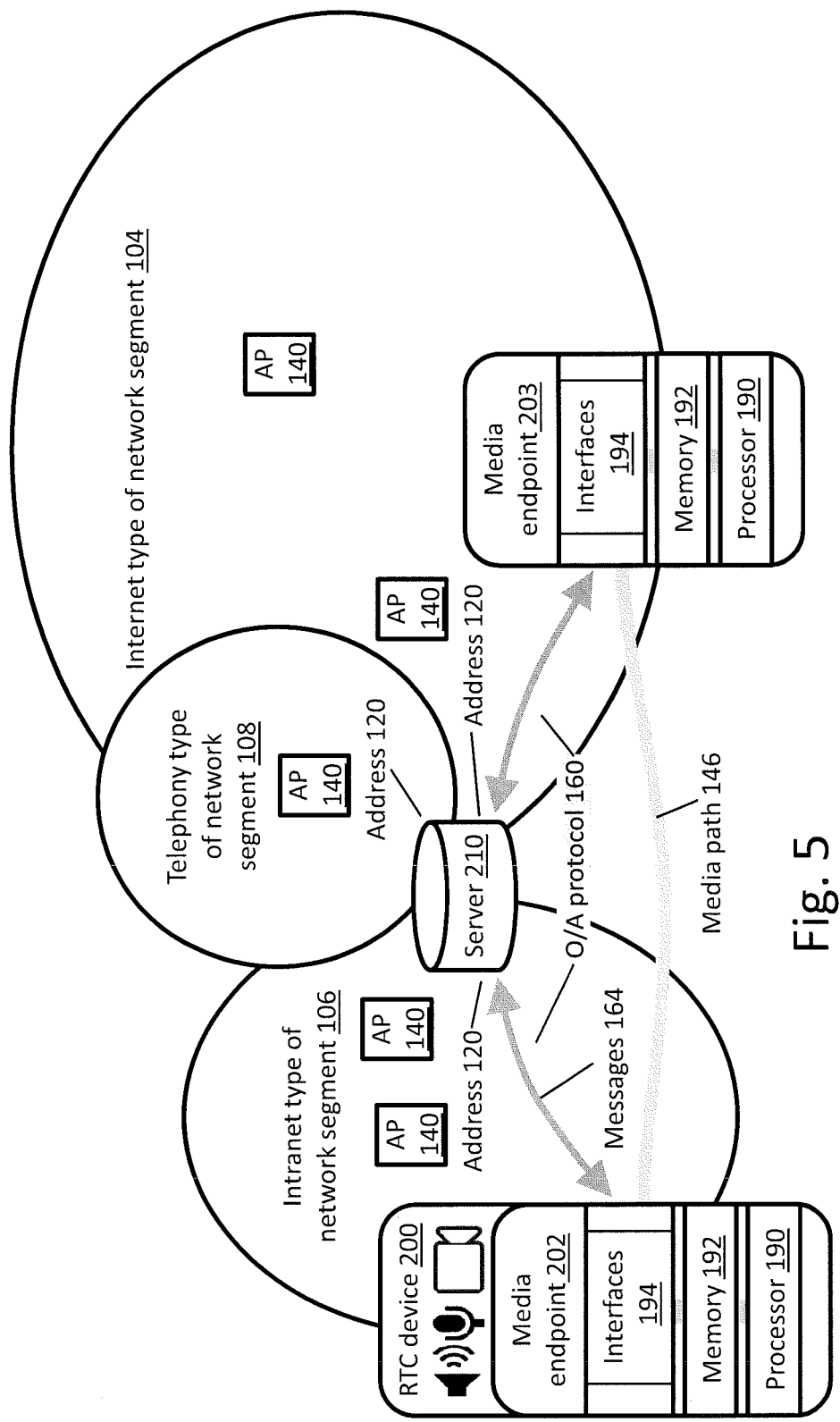
FIG. 5 shows a system using a method for handover of calls between endpoints according to an embodiment of the invention.

A method for establishing or reestablishing a media path between endpoints according to an embodiment is shown in FIG. 5, where endpoints have one or more network interfaces 194 of different types and are connected to network access points 140 at different types of network segments 104, 106, 108, to implement handover of calls.

Mobile phones typically allow a call to be maintained and continue when accessing the telephony network through different cell towers. Similarly, this embodiment of establishing and reestablishing of media streams allows Real Time Communication devices (RTC devices) 200 (e.g. software clients or applications on smart phones), to maintain an ongoing call when network access points are changed, when using different network interfaces (e.g. fixed Ethernet, Wi-Fi, mobile 3G data and LTE) and via various network access service providers.

Figure 1:
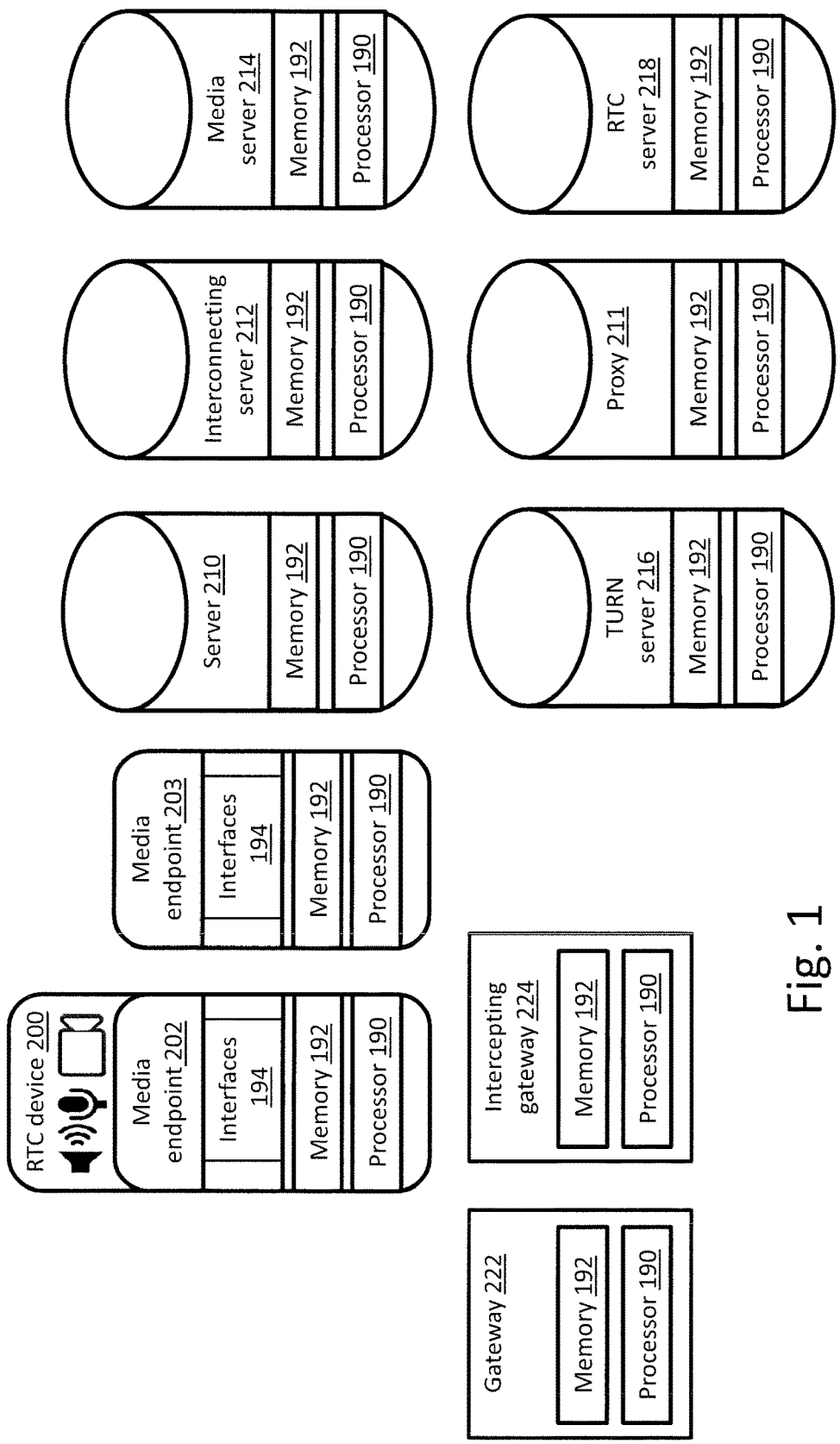
FIG. 1 shows a device, endpoints, servers, a proxy and gateways including a processor connected memory according to the related art.
Figure 2:
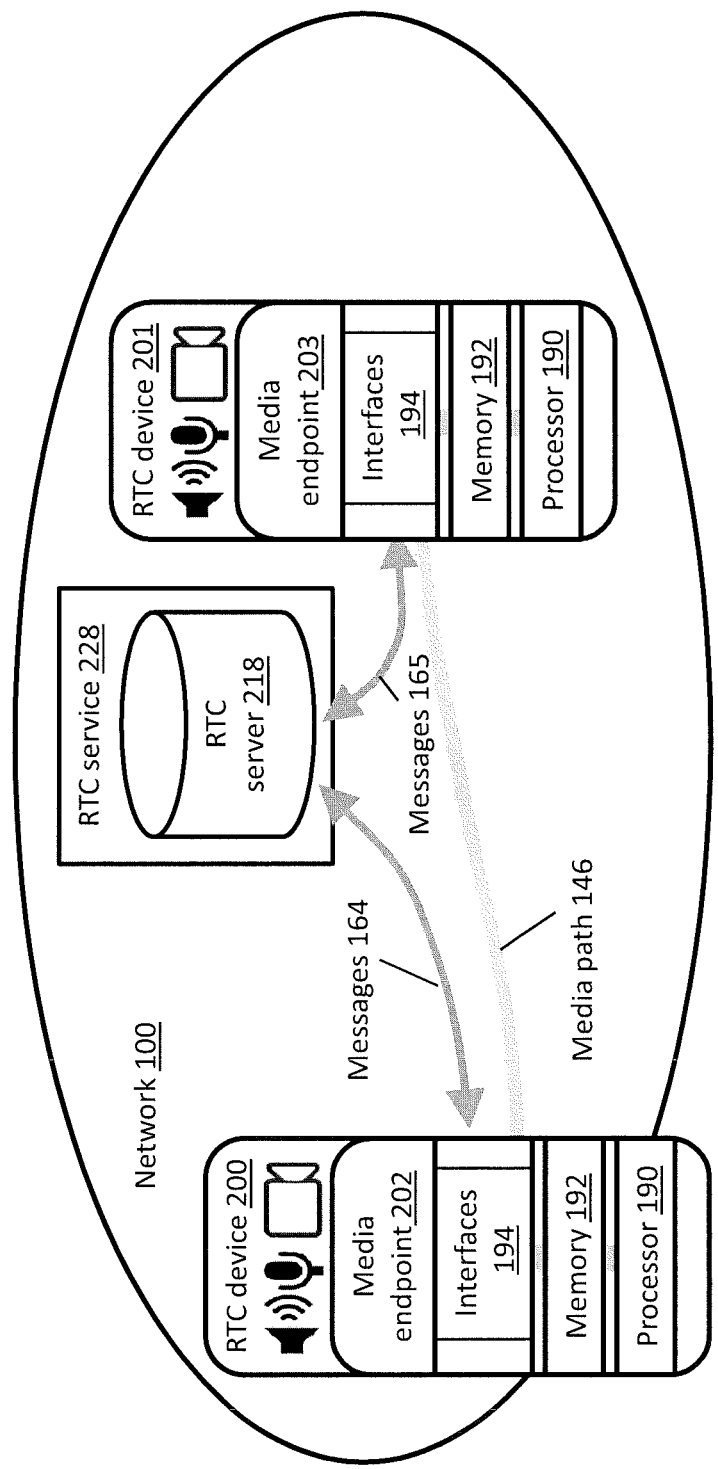
FIG. 2 shows a system for real time communication between two RTC devices using one server according to the related art.
Figure 3:
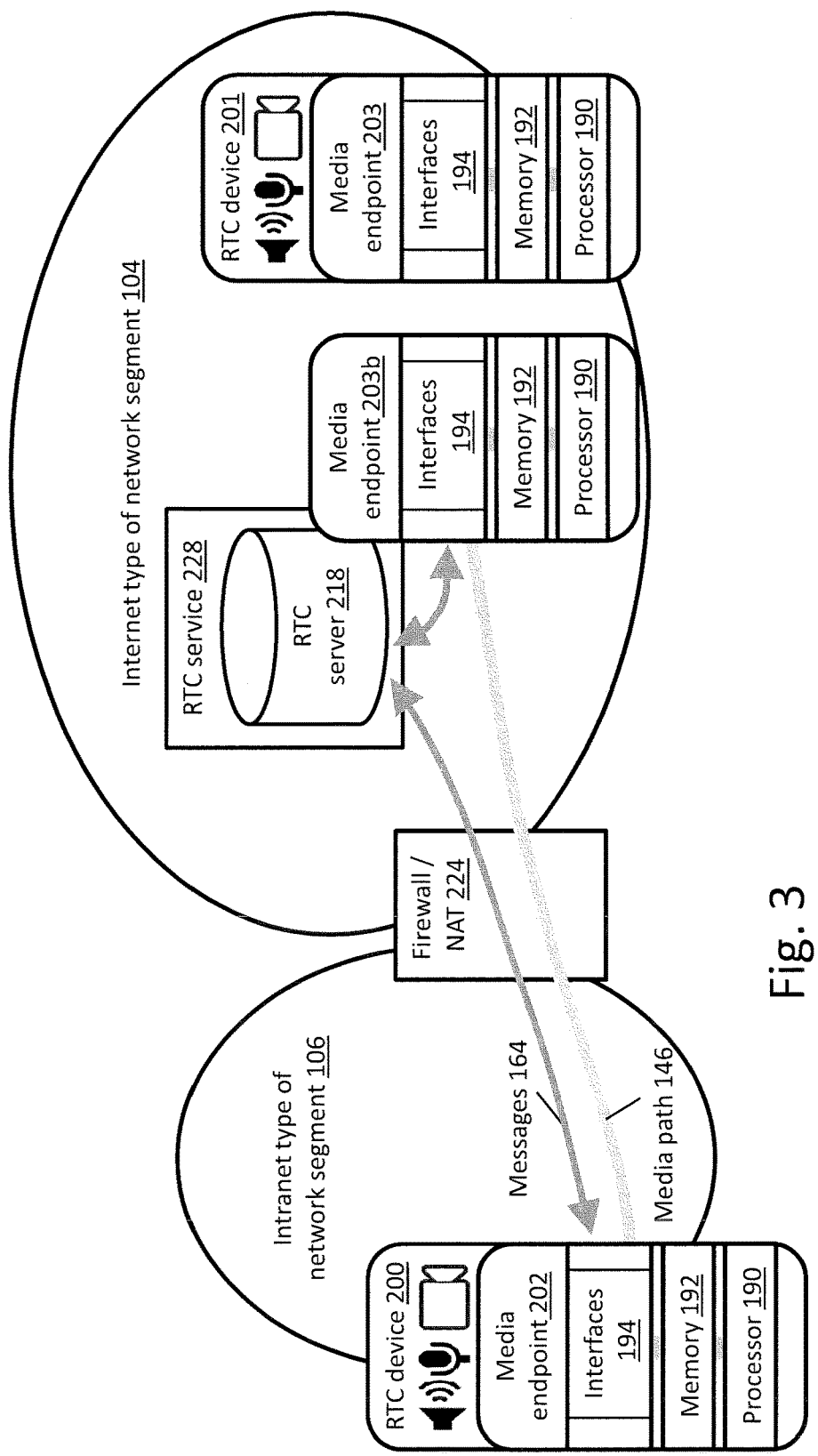
FIG. 3 shows a system for real time communication between endpoints at different network segments according to the related art.
Figure 4:
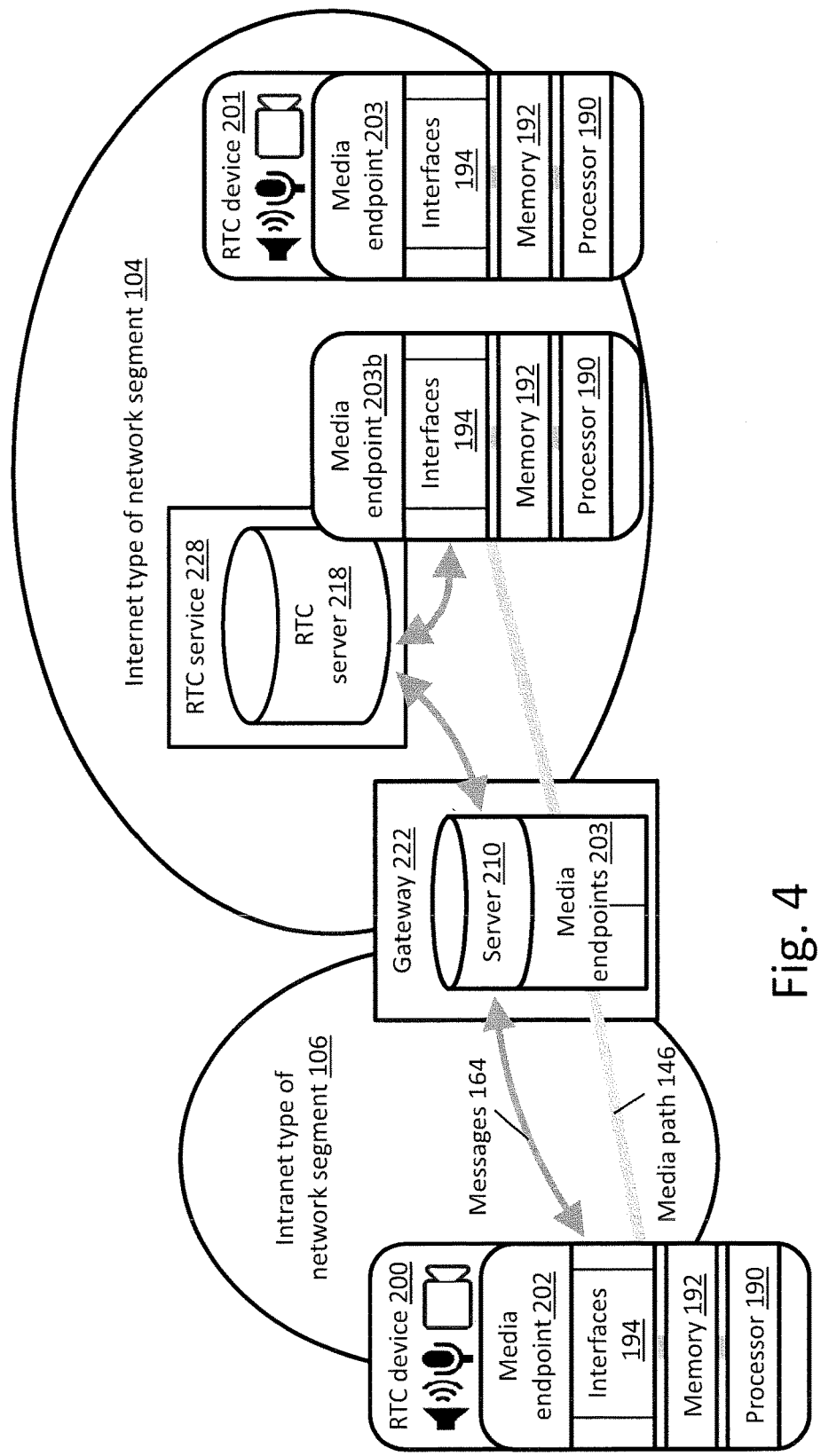
FIG. 4 shows a system for real time communication between endpoints on different network segments separated by a gateway according to the related art.

To achieve this capability to handover calls, a Real Time Communication device (RTC device) 200 including a media endpoint 202 and the other media endpoint 203 to communicate with, have peer-to-peer media capability by using an Offer and Answer protocol (O/A protocol) 160 to establish and reestablish a media path 146 between them. Such media path may pass a firewall or NATs shown in FIG. 3 and a TURN server shown in FIG. 1.

Both endpoints can be connected to a server 210 reachable at some address 120 from access points 140 at the network segments 104, 106 and 108, where the endpoints will be used;

The RTC device (200) is via at least one network interface (194) connected to some network access point 140 establishing a signaling channel to or through the server 210 by sending and receiving messages 164.

The RTC device 200 may reach the server 210 via a FQDN looked up in DNS even if the numeric address of the server 210 may have changed, due to access via another network segment 104, 106, 108. The server 210 may be connected to several network segments with a separate address 120 on each segment. An RTC device 200 changing its access to another network segment 104, 106, 108, can then have received the addresses 120 of the server 210 on the various network segments 104, 106, 108 it is connected to, from the server 210 in advance of the change of access point 140 and can then reconnect via the new network segment.

After establishing a connection between the RTC device 200 and the server 210, a unique connection identity is created and shared between the RTC device 200 and the server 210 to allow a non responding connection to be identified and recovered.

When the network access point 140 or the network interface 194 used by the RTC device 200 for connecting to the server 210 may change or the access point 140 or the network interface 194 used for a media path 146, may change during a call, the following steps can establish or reestablish the media path 146:

The RTC device (200) collects addresses 120 to the server 210 from the access points 140 at the network segments 104, 106 and 108, by retrieving one or more addresses 120 to the server 210 from a call setup procedure, by retrieving one or more addresses 120 to the server 210 as a source address of a message 164 from the server 210, by receiving a message 164 from the server 210 conveying one or more addresses 120 to the server 210, by using DNS or other database look up of addresses 120 to the server 210, or by storing a list of predetermined addresses 120 to the server 210.

The RTC device 200 repeatedly sends messages 164, to an address 120 of the server 210 and, if not receiving a response, then trying other collected addresses 120 to the server 210 until receiving a response and recovering signaling connectivity by continuing sending messages (164) to the address (120) from which the response was received.

If the signaling between the RTC device 200 and the server 210 is recovered, the connection identity is presented by the RTC device 200 to the server 210 for recovering the specific connection, to be able to receive calls or to use the O/A protocol 160 to establish and reestablish the a media path between the RTC device 200 and the second media endpoint 203.

The RTC device 210, determines a need for media path reestablishment, by monitoring or being informed of whether the media path 146 needs to be reestablished.

If the media path needs to be reestablished, the RTC device 200 initiates reestablishment of the media path 146 by using the O/A protocol 160 via the server 210.

The media channel is typically monitored separately and tried to be reestablished only when having been interrupted or showing bad quality.

In a further embodiment to do handover of calls, also referring to FIG. 5, the RTC device 200 may detect a need for media path reestablishment by the occurrence of one of the following changed addresses or media path conditions:

The RTC device 200 detecting or being informed by a message 164 from the server 210 that its address used for connecting to the server 210 has changed and the media path 146 being dependent of that changed address The RTC device 200 receiving a message 164 from the server 210 where a destination address of the message 164 has changed compared to an earlier message and the media path 164 being dependent of the changed address.

The RTC device 200 detecting that its address for the media path 146 has changed.

The RTC device 200 being informed by a message 164 from the second media endpoint 203 via the server that the address used for the media path 146 by the second media endpoint has changed.

The RTC device 200 detecting or being informed that the traffic in either direction of the media path 146 between the RTC device 200 and the second media endpoint 203 has stopped or deteriorated.

The media channel is typically monitored separately and tried to be reestablished only when having been interrupted or showing bad quality.

In a further embodiment to do handover of calls, also referring in FIG. 5, the RTC device 200 is adapting a frequency of sending messages repeatedly to the server 210 depending on whether a call is ongoing, or whether there are NAT or firewall openings that need to be kept alive.

Figure 6:
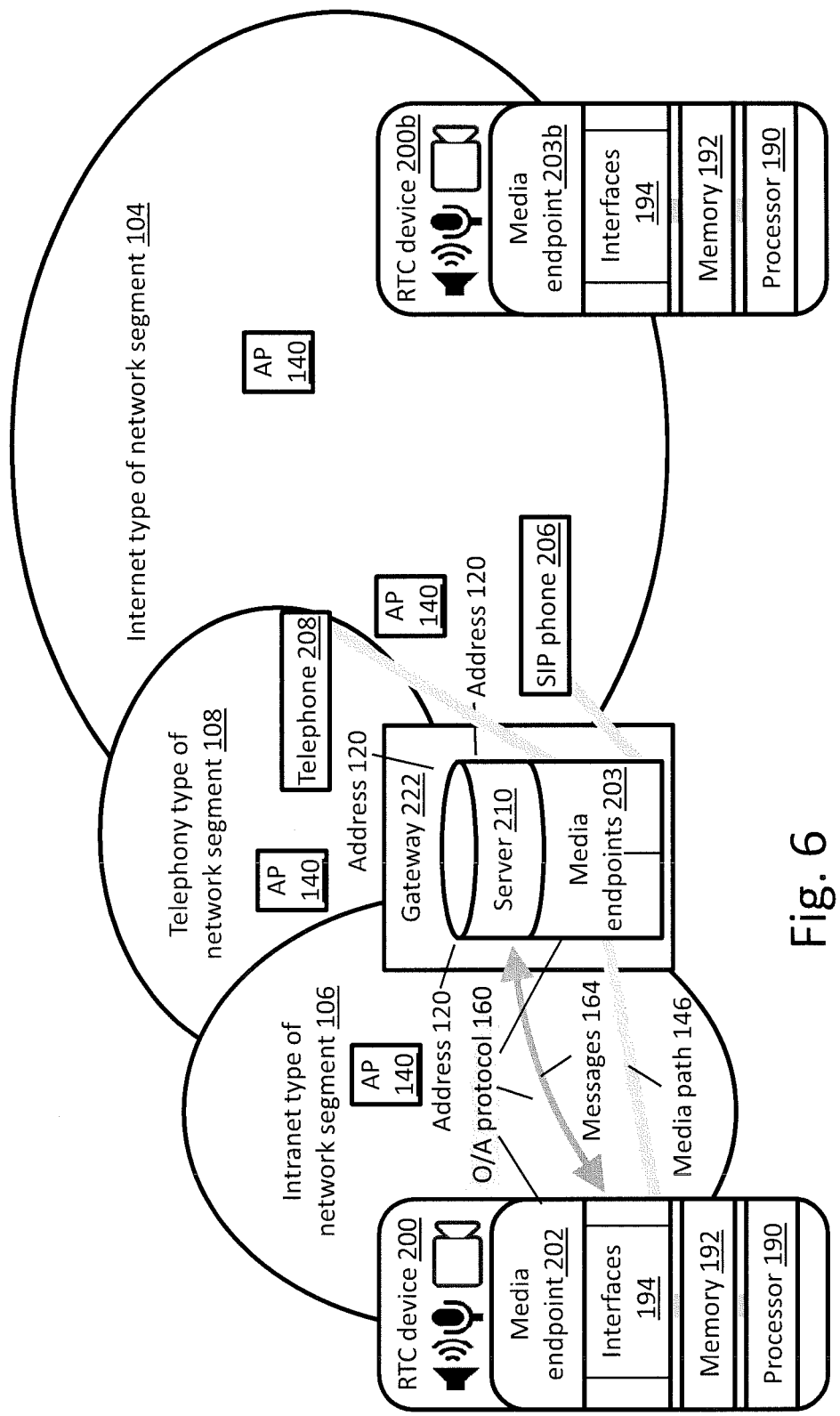
FIG. 6 shows a system using a method for handover of calls including a gateway according to an embodiment of the invention.

A further embodiment is shown in FIG. 6, where a gateway 222 integrates the second media endpoint 203 with the server 210 for connecting calls to endpoints that are incompatible with the RTC device 200 regarding signaling or media, or for connecting calls over network segments 104, 106, 108 that are incompatible regarding signaling or media, when a protocol used by the RTC device 200 requires media encryption and encryption keys are negotiated over the media path 146 by the media endpoints 202, 203 and has protection against man in the middle attacks by checking a fingerprint only available to the server 210 through a signaling channel.

Figure 7:
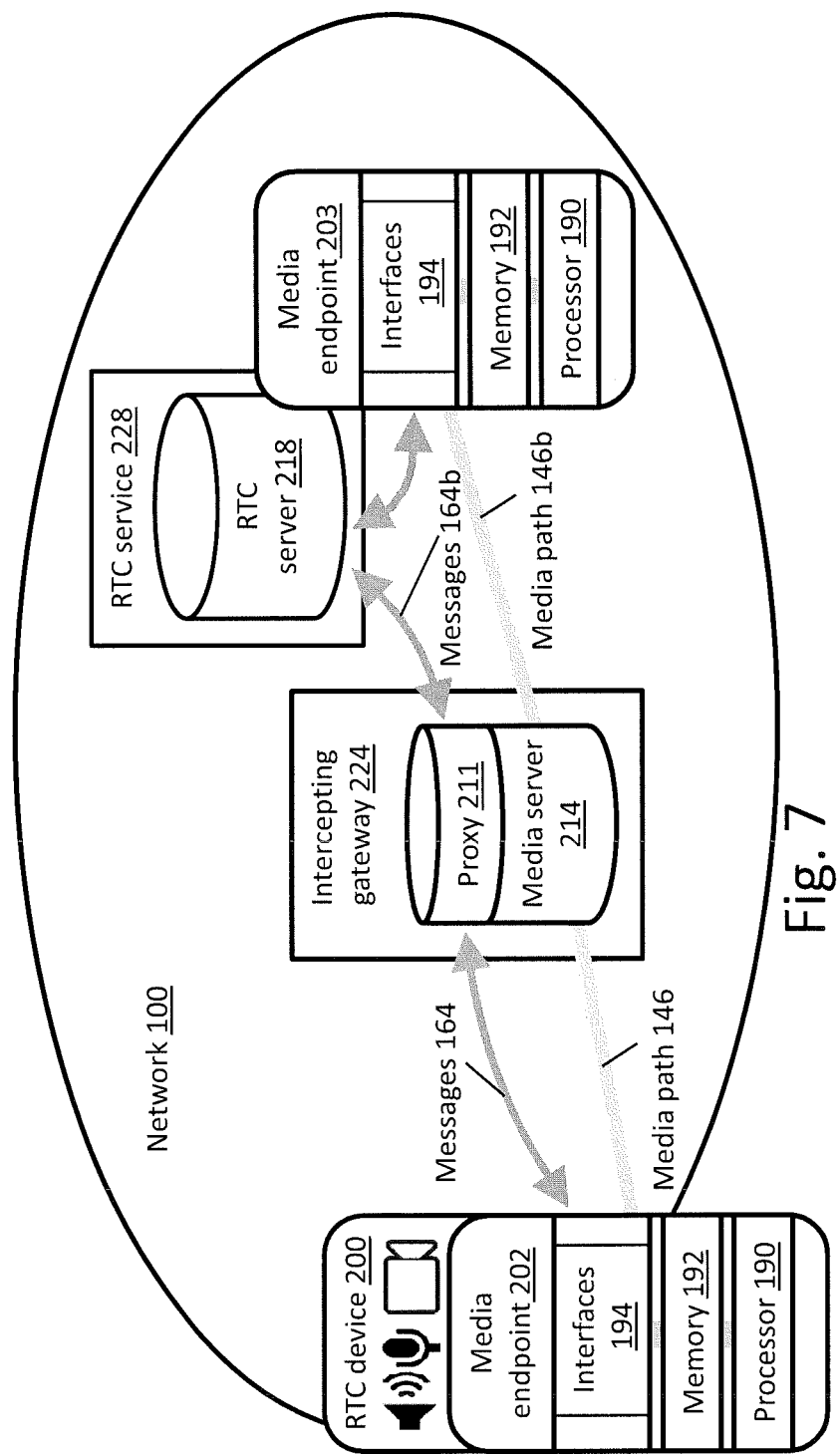
FIG. 7 shows a system using a method for intercepting and decrypting Real Time Communication (RTC) media traffic using a proxy and media server according to an embodiment of the invention.

A method for establishing or reestablishing a media path between endpoints for intercepting and decrypting Real Time Communication (RTC) media traffic between an RTC device 200 and an RTC service 228 using a communication protocol, where the media traffic is protected against man in the middle attacks using a fingerprint, for monitoring, analyzing and recording purposes, according to an embodiment is shown in FIG. 7.

Modern protocols, e.g. WebRTC, not only allows encrypted media traffic, but even mandates encrypted media traffic between endpoints and includes protection against man in the middle attacks, making it difficult for call centers and others to monitor, analyze and record RTC communication. In this embodiment a proxy 211 is used to get control over the signaling and a media server 214 is intercepting, decrypting and relaying the media traffic.

The Real Time Communication device (RTC device) 200 comprises a first media endpoint 202, a second media endpoint 203, an RTC server 218 and an intercepting gateway 224, each of the RTC device 200, the second media endpoint 203, the RTC server 218 and the intercepting gateway 224 having a memory 192 and a processor 190 coupled to the memory 192.

The intercepting gateway 224, integrates a proxy 211 for the communication protocol used by the RTC service 228 and a media server 214, each of the proxy 211 and the media server 214 having a memory 192 and a processor 190 coupled to the memory 192.

The RTC media path is established between the RTC device 200 and the media server 214 and between the media server 214 and the second media endpoint 203, by the proxy 211 rewriting messages 164, 164b.

The fingerprint is arranged by the proxy 211 rewriting messages 164, 164b for the interception, decryption and transferring of the RTC media traffic by the media server 214.

The RTC device 200) is configured to use said proxy 211 for the communication protocol used by the RTC service 228.

Figure 8:
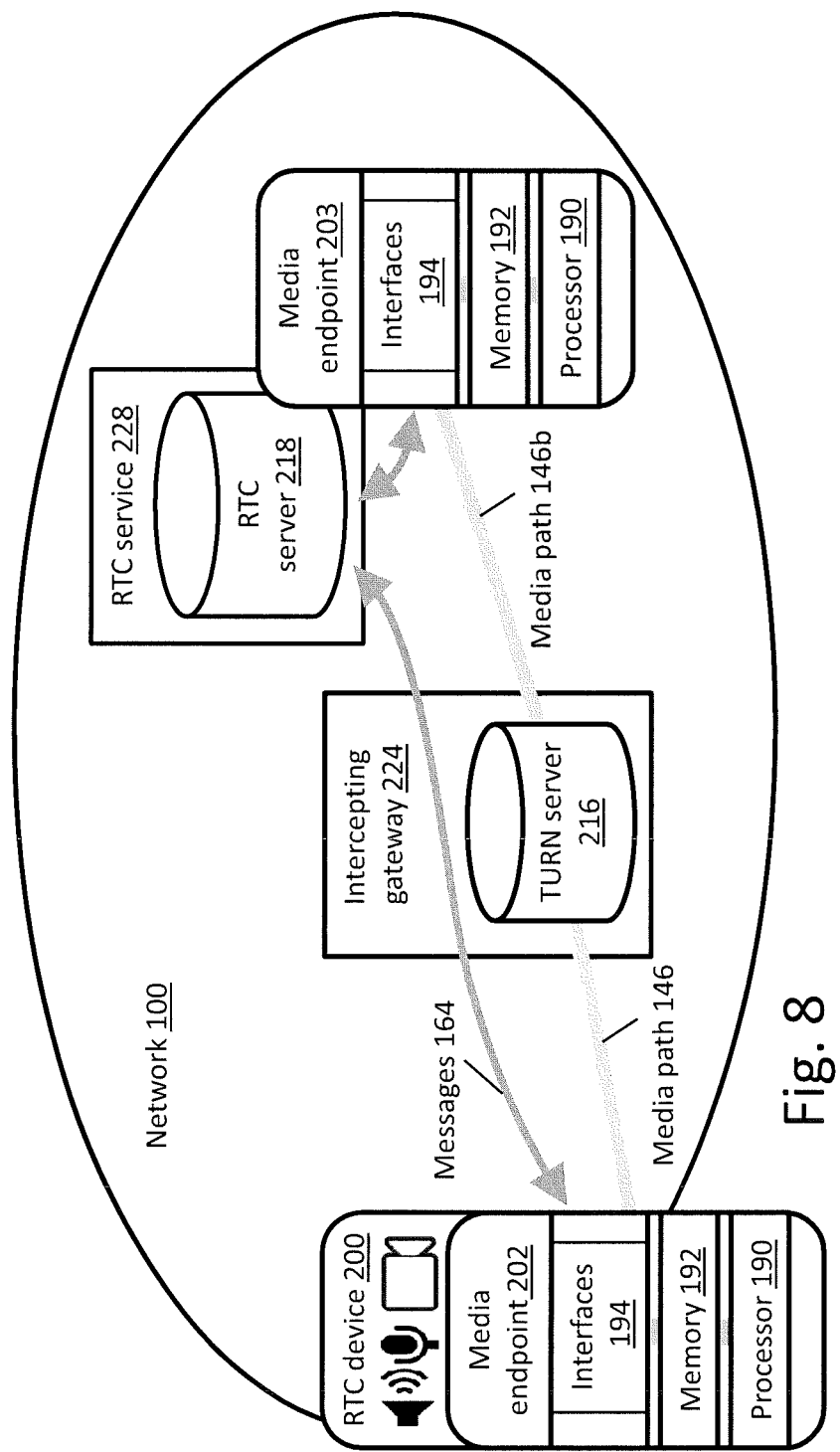
FIG. 8 shows a system using a method for intercepting and decrypting Real Time Communication (RTC) media traffic using a TURN server according to an embodiment of the invention.

A method for establishing or reestablishing a media path between endpoints for intercepting and decrypting Real Time Communication (RTC) media traffic between an RTC device 200 and an RTC service 228 using a TURN protocol, where the media traffic is protected against man in the middle attacks using a fingerprint, for monitoring, analyzing and recording purposes, according to another embodiment is shown in FIG. 8.

Modern protocols, e.g. WebRTC, not only allows encrypted media traffic, but even mandates encrypted media traffic between endpoints and includes protection against man in the middle attacks, making it difficult for call centers and others to monitor, analyze and record RTC communication. In this embodiment a TURN server 216 is relaying the media traffic.

Media streams will flow through a TURN server if it is considered "sealed" as outlined in IETF draft-schwartz-rtcweb-return-06, or if the TURN server is auto discovered or assigned by a software application and enforced to be used.

The intercepting gateway may also be built into an IP default gateway or a firewall/NAT between the media endpoints.

Another location of the intercepting server may be in the device handling real-time traffic between a local or private network and a global transport network, to handle use cases where the RTC is on a private domain and external traffic is to be monitored. A remote user to such private domain, sending its media to said intercepting server, can also be analyzed using the proposed method.

Further, a client, e.g. a WebRTC browser configured to do so, can establish the media through an intercepting server by modifying the ICE procedure or by other means.

For clients, not implementing to convey keys or to establish media through an intercepting server, e.g. the current browsers, such things can be added by a plug-in or extension to the browser.

The Real Time Communication device (RTC device) 200 comprises a first media endpoint 202, a second media endpoint 203, an RTC server 218 and an intercepting gateway 224, each of the RTC device 200, the second media endpoint 203, the RTC server 218 and the intercepting gateway 224 having a memory 192 and a processor 190 coupled to the memory 192.

The intercepting gateway 224, integrates a TURN server 216 having a memory 192 and a processor 190 coupled to the memory 192 with the intercepting gateway 224.

The RTC media path is established between the RTC device 200 and the TURN server 216 and between the TURN server 216 and the second media endpoint 203, by configuring the RTC device 200 or the RTC service 228 to use the TURN server 216, or by one of the media endpoints 202 or 203 discovering the TURN server 216 in a sealed network segment.

The decryption key for the RTC media traffic is conveyed to the intercepting gateway 224, by the first media endpoint 202 or by the second media endpoint 203, for decrypting the RTC media traffic passing the intercepting gateway 224.

The intercepting server can also be built into an SBC (Session Border Controller) that typically handles media flows to traverse NAT and firewalls.

Figure 9:
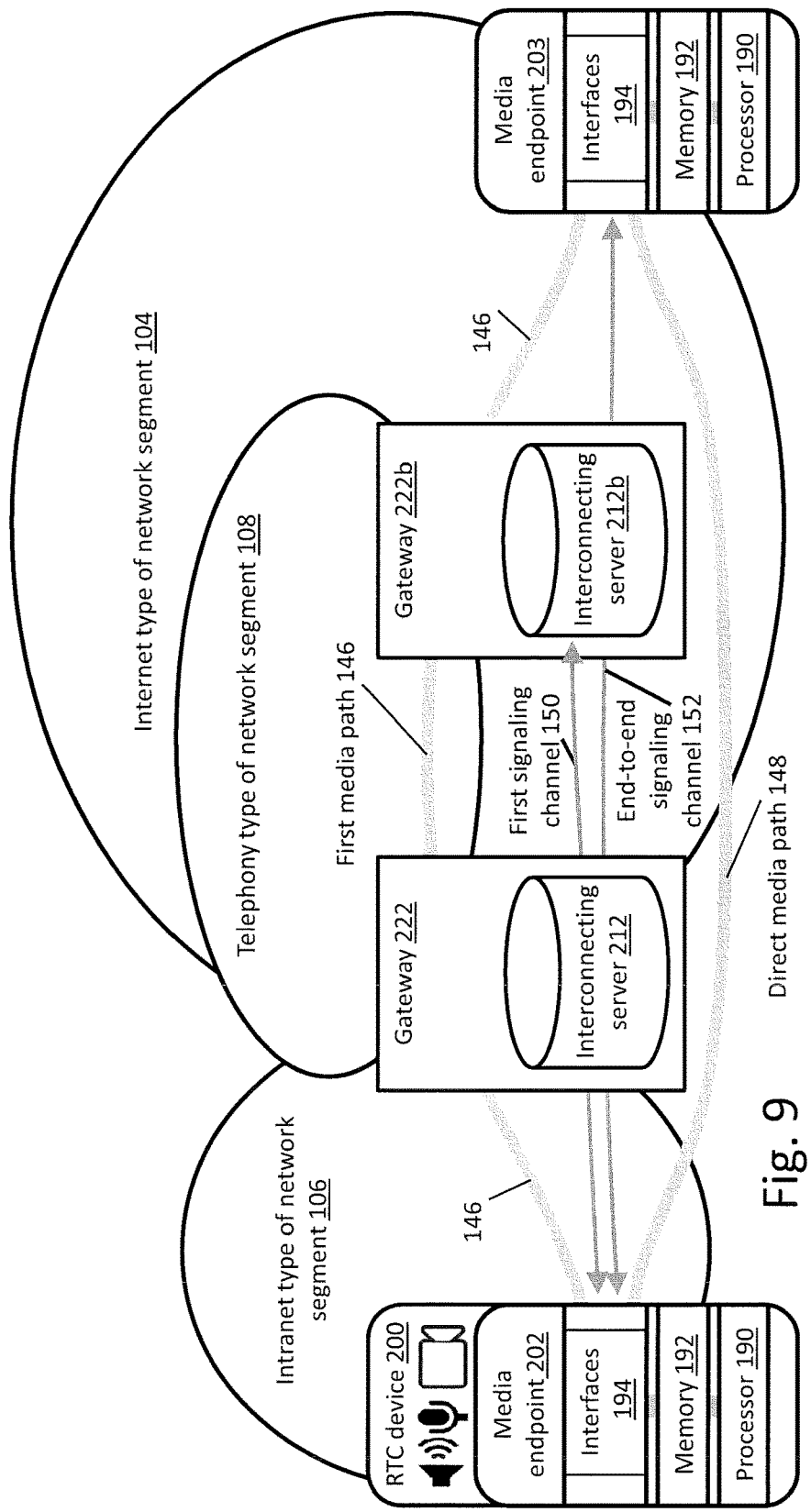
FIG. 9 shows a system using a method to achieve a direct media path between endpoints over network segments of different types according to an embodiment of the invention.

A method for establishing or reestablishing a media path between endpoints 202, 203 with peer-to-peer media capability, connected over a network with gateways 222 between network segments of different types 104, 106, 108, to achieve a direct media path for richer media, improved media quality, lower network load or lower cost calls according to an embodiment is shown in FIG. 9.

VoIP services, even when a call starts from a computer client or an IP phone on a LAN (an intranet type of network segment) or on the Internet, almost always include gateway functionality into a telephony type of network segment and even when the other endpoint is a compatible VoIP phone, the media traffic is restricted or costly, because it involves the telephony type of network segment. With modern protocols, e.g. WebRTC and SIP or a combination thereof, also capable of video, it would be advantageous to establish a direct media path between compatible endpoints, rather than setting up a media path over a telephony type of network segment.

Real time communion calls, today also most telephone calls, connects endpoints in a two step process with messages over a signaling channel, which may be over several network segments and interconnecting servers 210, 212, followed by media channel establishment, which also may be over several network segments and servers. Any of these connections may be used for sending and receiving at least limited amounts of data between the endpoints and it should be noticed that a media path for conventional voice telephony, still is able to transfer data content, e.g. in the form of DTMF digits.

When two endpoints have established a signaling channel or a media path between each other that is not a direct media path between the endpoints, it may be advantageous to continue the setup process to establish or reestablish a direct media path between the endpoints, also called a peer-to-peer media path, that otherwise may be a media path over several network segments with gateways in between. Either of the endpoints can indicate to the other endpoint that it has peer-to-peer media path capability and either of the endpoints can initiate such establishment or reestablishment. Such direct media path may in this context include TURN servers and still be considered a direct media connection.

Initiating establishment or reestablishment of a media path may be signaled over a signaling channel or a media path, by using a O/A protocol. However, if the media path only is for voice, an O/A protocol may be too long to e.g. encode into DTMF digits and to transfer over that voice channel. In such cases a compressed version of the O/A protocol can be used. Alternatively (and often better) one endpoint can request that the other endpoint connects to the same server that it is self connected to, through which the O/A protocol can be executed and a direct media connection between the endpoints can be established.

This mechanism could be implemented in a WebRTC browser, that is in contact with a server (a web server) over which its signaling is transferred. The request could then be implemented as a transfer of a HTTP URL to the other endpoint over the signaling channel or media path, where after the full O/A protocol could be signaled via the then common server 210.

The Real Time Communication device (RTC device) 200 comprises a first media endpoint 202, a second media endpoint 203 and interconnecting servers 212, 212b, each of the RTC device 200, the second media endpoint 203 and the interconnecting servers 212, 212b has a memory 192 and a processor 190 coupled to the memory 192.

The RTC device 200 and the second media endpoint 203 are configured to have peer-to-peer media capability by using an Offer and Answer protocol (O/A protocol) to establish and reestablish a media path for media traffic of different types.

When attempting to set up a call between the RTC device 200 and the second media endpoint 203, not knowing whether they have mutual per-to-per media compatibility or whether the interconnecting servers 212, 212b convey the O/A protocol between the RTC device 200 and the second media endpoint 203 to establish a direct media path 148 between the RTC device 200 and the second media endpoint 203, the following steps can establish a direct media path 148:

The RTC device 200, establishes a first signaling channel 150 to the interconnecting server 212b that the second media endpoint 203 is connected to.

Either the RTC device 200 receives an indication of mutual peer-to-peer media compatibility and then invokes one of the following processes for direct media path establishment or reestablishment:

The RTC device 200 requests establishment of a direct media path 148 for the call, using the O/A protocol, which may be compressed, through an end-to-end signaling channel 152 between the RTC device 200 and the second media endpoint 203, or the RTC device 200 requests establishment of a direct media path 148 for the call, using the O/A protocol, which may be compressed, through an established first media path 146, between the RTC device 200 and the second media endpoint 203, or the RTC device 200 sends information about the call setup and a network address of the interconnecting server 212 that the RTC device 200 is connected to, which may be in form of a HTTP URL, which may be shortened, compressed, limited in time or DTMF encoded, through an established first media path 146 or through an end-to-end signaling channel 152, for establishment of a direct media path 148 for the call using the O/A protocol.

or the second media endpoint 203 receives an indication of mutual peer-to-peer media compatibility and then invokes one of the following processes for direct media path establishment or reestablishment:

The second media endpoint 203 requests establishment of a direct media path 148 for the call, using the O/A protocol, which may be compressed, through an end-to-end signaling channel 152 between the RTC device 200 and the second media endpoint 203, or the second media endpoint 203 requests establishment of a direct media path 148 for the call, using the O/A protocol, which may be compressed, through an established first media path 146, between the RTC device 200 and the second media endpoint 203, or the second media endpoint 203, sends information about the call setup and a network address of the interconnecting server 212b that the second media endpoint 203 is connected to, which may be in form of a HTTP URL, which may be shortened, compressed, limited in time or DTMF encoded, through an established first media path 146 or through an end-to-end signaling channel 152, for establishment of a direct media path 148 for the call using the O/A protocol.

Another embodiment, referring to FIGS. 5, 7, 8 and 9 the second endpoint 203 may be another RTC device 200 or gateway 222, 224.

A further embodiment may be a system for communication over a network using the method for establishing or reestablishing a media path, further comprising two or more endpoints 202, 203, 203b.

In a further embodiment the user agents coupled to the RTC devices 200 are implemented in the server 210 or interconnecting servers 212, 212b.

A further embodiment, referring to FIG. 9, is a system where the interconnecting servers 212, 212b use the SIP protocol between each other and the SIP user agents coupled to the RTC devices 200 are implemented in the interconnecting servers 212, 212b.

Another embodiment, referring to FIG. 6 is to offload the gateway 222 to enable communication when (i) the defined O/A protocol for the media endpoints 202, 203, 203b is incompatible with an endpoint 208 or 206 or a network segments 104, 106 or 108, implementing in the media endpoints 202, 203, 203b, by deviating from the defined O/A protocol, an O/A protocol that is compatible with the endpoints and the network segment to communicate with, and when (ii) the defined media path capabilities for the media endpoints 202, 203, 203b are incompatible with an endpoint 208 or 206 or a network segments 104, 106 or 108, implementing in the media endpoints 202, 203, 203b, by deviating from the defined media path capabilities, media path capabilities that are compatible with the endpoints and the network segment to communicate with, to offload the gateway 222 to enable communication.

In another embodiment, the system for communication over a network includes two or more RTC endpoints.

In another embodiment, a client side of the system is implemented by a telecommunication device.

In another embodiment, a server side of the system, which may be part of a Session Border Controller is implemented by a telecommunication device.

In another embodiment, the device for telecommunication incorporates and can send a program to a client.

In another embodiment, the device for telecommunication is a web server.

In another embodiment, the client or server side of the system is implemented by a software module in a web browser or as an application for smartphones, tablets, laptop or personal computers or computer servers, or in a telecommunication device comprising a processor for executing a program.

In another embodiment, user agents coupled to the RTC devices of the system are implemented in the server, interconnecting servers or RTC server.

In another embodiment, the interconnecting servers use the SIP protocol between each other and SIP user agents coupled to the RTC devices are implemented in the interconnecting servers.

Figure 10A:
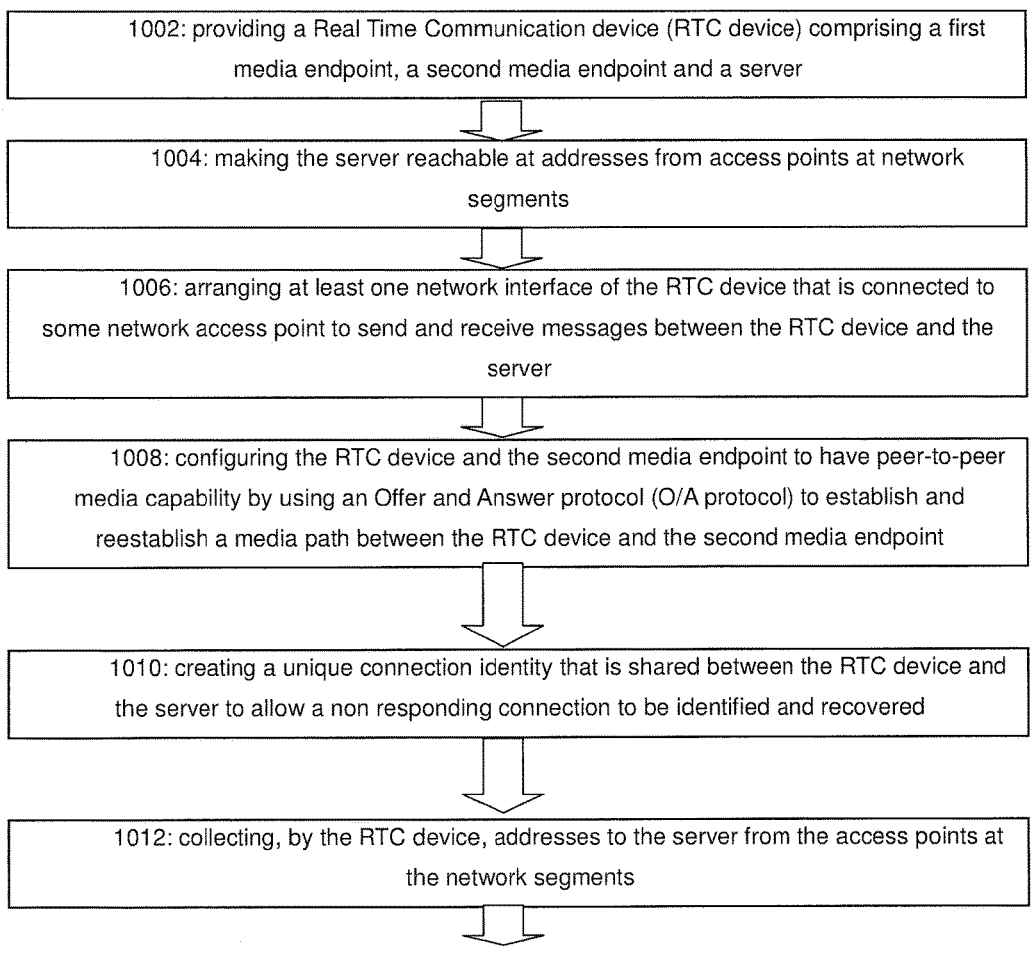
FIGS. 10A and 10B show a process for establishing or reestablishing a media path between endpoints for handover of calls according to an embodiment.
Figure 10B:
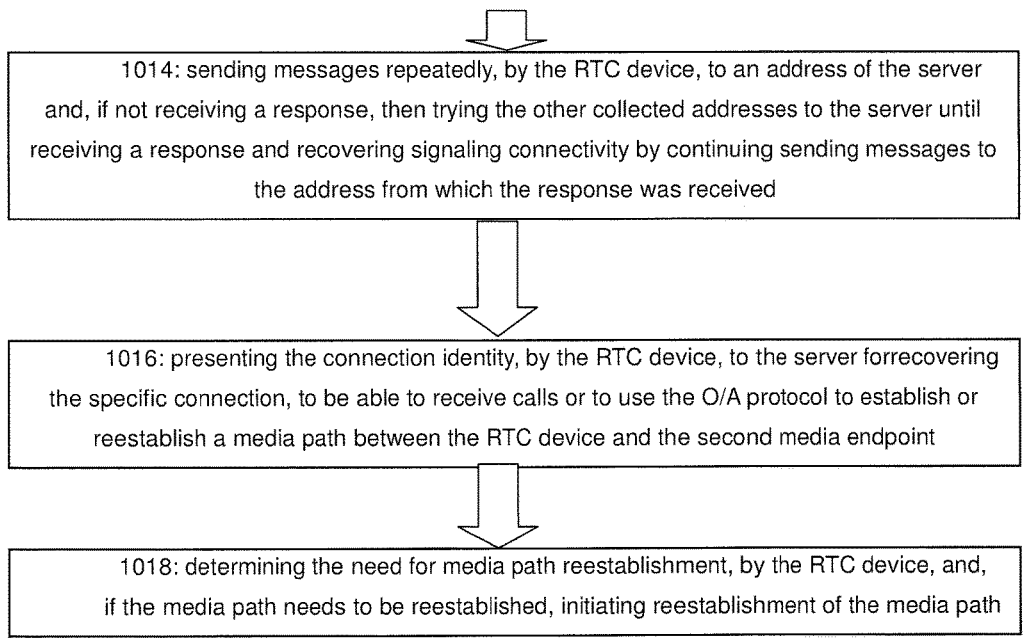

In another embodiment, the server or interconnecting server is combined with a gateway or intercepting gateway, In FIGS. 10A and 10B is shown a process for establishing or reestablishing a media path between endpoints for handover of calls according to an embodiment. In a first operation 1002, shown in FIG. 10A, a Real Time Communication device (RTC device) comprising a first media endpoint, a second media endpoint and a server is provided. In a second operation 1004, the server is made reachable at addresses from access points at network segments. In a third operation 1006, at least one network interface of the RTC device that is connected to some network access point is arranged to send and receive messages between the RTC device and the server. In a fourth operation 1008, the RTC device and the second media endpoint are configured to have peer-to-peer media capability by using an Offer and Answer protocol (O/A protocol) to establish and reestablish a media path between the RTC device and the second media endpoint. In a fifth operation 1010, a unique connection identity is created that is shared between the RTC device and the server to allow a non responding connection to be identified and recovered, In a sixth operation 1012, addresses to the server from the access points at the network segments are collected by the RTC device. In a seventh operation 1014, shown in FIG. 10B, messages are sent repeatedly by the RTC device to an address of the server and, if no response is received, then other collected addresses to the server are tried until a response is received and signaling connectivity is recovered by continuing sending messages to the address from which the response was received. In an eighth operation 1016, the connection identity is presented by the RTC device to the server for recovering the specific connection, to be able to receive calls or to use the O/A protocol to establish or reestablish a media path between the RTC device and the second media endpoint. In a ninth operation 1018, the need for reestablishing the media path is determined by the RTC device and, if the media path needs to be reestablished, reestablishment of the media path is initiated.

Figure 11:
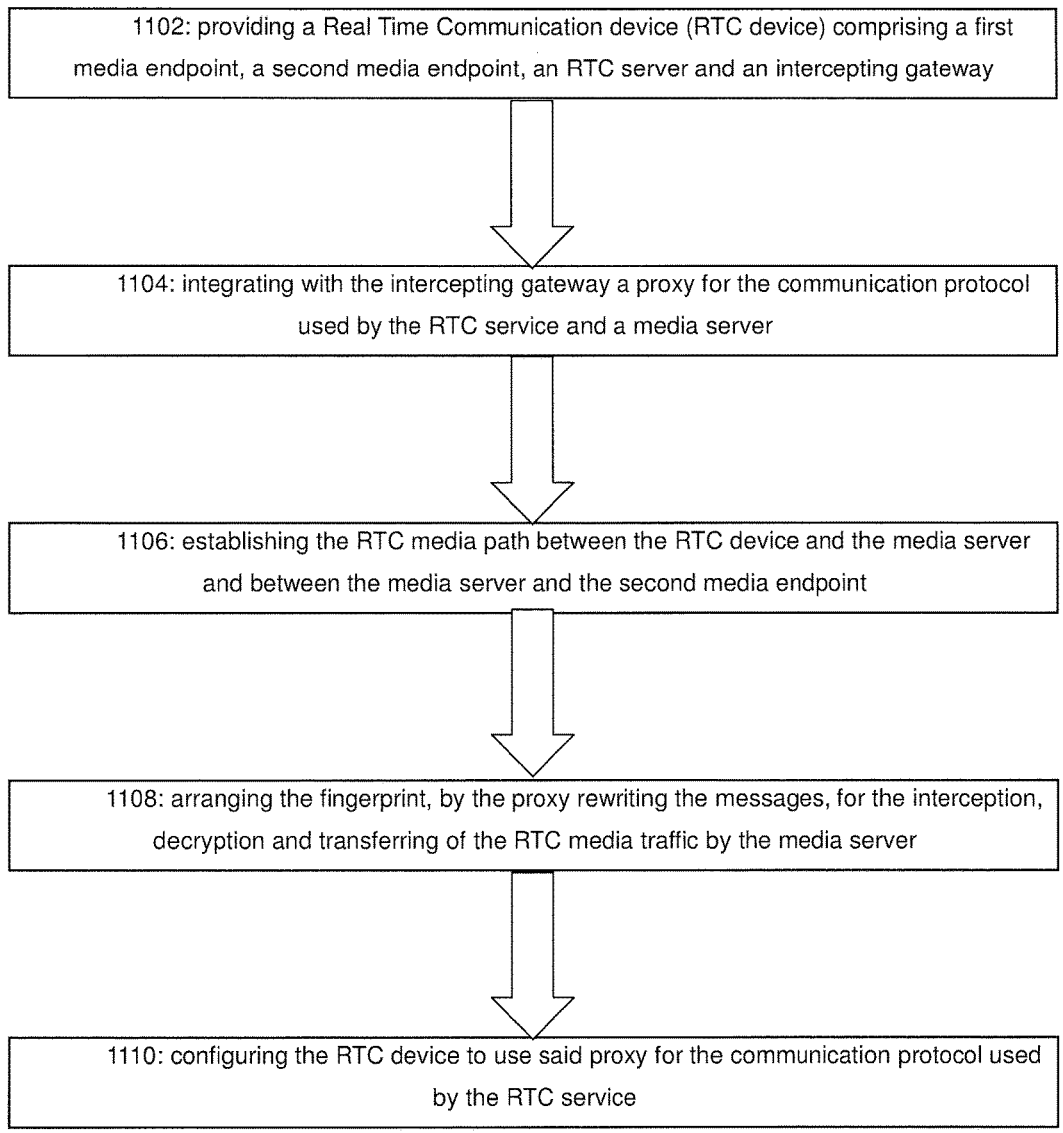
FIG. 11 shows a process for establishing a media path for intercepting RTC traffic between endpoints according to an embodiment using a proxy.

In FIG. 11 is shown a process for establishing a media path for intercepting RTC traffic between endpoints according to an embodiment using a proxy. In a first operation 1102, a Real Time Communication (RTC) device comprising a first media endpoint, a second media endpoint, an RTC server, and an intercepting gateway is provided. In a second operation 1104, a proxy for the communication protocol used by the RTC service and a media server is integrated with the intercepting gateway. In a third operation 1106, the RTC media path is established between the RTC device and the media server and between the media server and the second media endpoint. In a fourth operation 1108, the fingerprint for the interception is arranged by the proxy rewriting the messages, for the decryption and transferring of the RTC media traffic by the media server. In a fifth operation 1110, the RTC device is configured to use the proxy for the communication protocol used by the RTC service.

Figure 12:
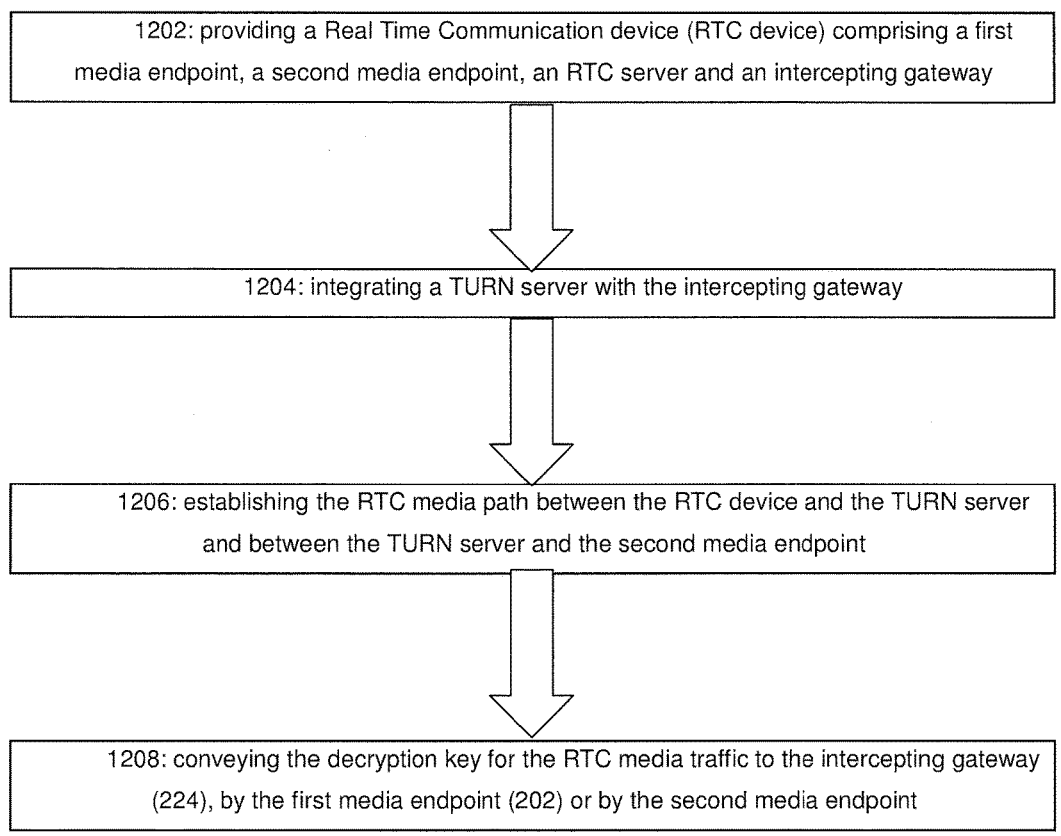
FIG. 12 shows a process for establishing a media path for intercepting RTC traffic between endpoints according to an embodiment using a TURN server.

In FIG. 12 is shown a process for establishing a media path for intercepting RTC traffic between endpoints according to an embodiment using a TURN server. In a first operation 1202, a Real Time Communication device (RTC device) comprising a first media endpoint, a second media endpoint, an RTC server and an intercepting gateway is provided. In a second operation 1204, a TURN server is integrated with the intercepting gateway. In a third operation 1206, the RTC media path is established between the RTC device and the TURN server and between the TURN server and the second media endpoint. In a fourth operation 1208, the decryption key for the RTC media traffic is conveyed to the intercepting gateway (224), by the first media endpoint (202) or by the second media endpoint.

Figure 13:
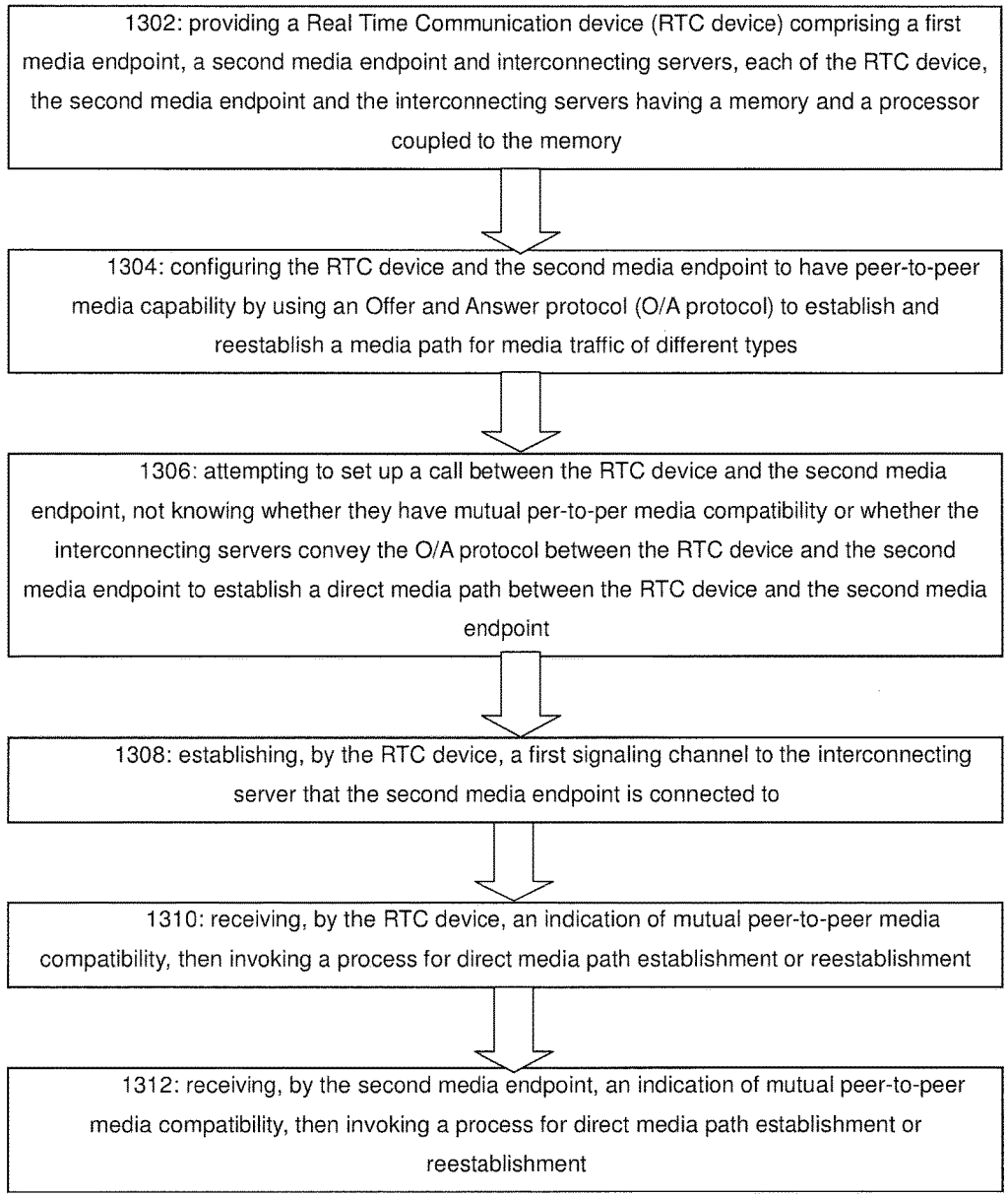
FIG. 13 shows a process for establishing or reestablishing a direct media path between endpoints according to an embodiment.

In FIG. 13 is shown a process for establishing or reestablishing a direct media path between endpoints according to an embodiment. In operation 1302, a Real Time Communication device (RTC device) comprising a first media endpoint, a second media endpoint and interconnecting servers is provided, each of the RTC device, the second media endpoint and the interconnecting servers having a memory and a processor coupled to the memory. In operation 1304, the RTC device and the second media endpoint are configured to have peer-to-peer media capability by using an Offer and Answer protocol (O/A protocol) to establish and reestablish a media path for media traffic of different types. In operation 1306, an attempt is made to set up a call between the RTC device and the second media endpoint, not knowing whether they have mutual per-to-per media compatibility or whether the interconnecting servers convey the O/A protocol between the RTC device and the second media endpoint to establish a direct media path between the RTC device and the second media endpoint. In operation 1310, the RTC device receives an indication of mutual peer-to-peer media compatibility, then invoking a process for direct media path establishment or reestablishment. In operation 1312, the second media endpoint receives an indication of mutual peer-to-peer media compatibility, and then invokes a process for direct media path establishment or reestablishment.

The embodiments can be implemented in computing hardware (computing apparatus) and/or software, such as (in a non-limiting example) any computer that can store, retrieve, process and/or output data and/or communicate with other computers. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, FLASH etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

When WebRTC is being said, it may also mean (or apply to) other real time communication protocols or in general a way of communicating.

The invention claimed is:

1. A method for establishing a media path between endpoints for intercepting and decrypting media traffic between an Real Time Communication, RTC, device (200) and an RTC service (228) using a communication protocol, where the media traffic is protected by encryption against man in the middle attacks using a fingerprint, for monitoring, analyzing and recording purposes, comprising:
   providing the RTC device (200) comprising a first media endpoint (202) and a second media endpoint (203) and an RTC server (218) and an intercepting gateway (224), each of the RTC device (200), the second media endpoint (203), the RTC server (218) and the intercepting gateway (224) storing software implementing the method in a memory (192) and a processor (190) coupled to the memory (192);
   further comprising:
   integrating, with the intercepting gateway (224), a proxy (211) for the communication protocol used by the RTC service (228) and a media server (214), each of the proxy (211) and the media server (214) storing software implementing the method in a memory (192) and a processor (190) coupled to the memory (192);
   characterized by:
   establishing the RTC media path, by the RTC device (200), between the RTC device (200) and the media server (214) and, by the RTC device (200), between the media server (214) and the second media endpoint (203), and by the proxy (211) rewriting messages (164, 164*b***);
   arranging the fingerprint, by the proxy (211) rewriting the messages (164, 164*b*), for the interception, decryption and transferring of the RTC media traffic via the media server (214**); and
   configuring the RTC device (200) to use said proxy (211) for the communication protocol used by the RTC service (228);
   whereby media traffic is intercepted and decrypted by establishing a media path through an intercepting gateway in a telecommunication service using fingerprint to protect against man in the middle attacks.

2. The method of claims 1, wherein said second endpoint (203) is another RTC device (200) or gateway (222, 224).

3. A system for communication over a network using the method according to claims 1, further comprising two or more RTC endpoints (202, 203, 203*b***).

4. A telecommunication device implementing a client side of the system of claim 3.

5. A telecommunication device implementing the server side of the system of claim 3, wherein said server side is part of a Session Border Controller, SBC.

6. The telecommunication device implementing the server side of claim 3, wherein said telecommunicating device incorporates a program and can send the program to a client, where the program implements a part of said RTC endpoints.

7. The telecommunication device of claim 6, where said program is on a web server incorporated in the telecommunication device.

8. A software module implementing the client or server side of the system of claim 3 in a web browser or as an application for smart phones, tablets, laptop or personal computers or computer servers, or in a telecommunication device comprising a processor coupled to a memory for executing a program.

9. The software module of claim 8, comprising a program performing a function selected from the group consisting of:
   sending messages (164) to endpoints, which may be shortened, compressed, limited in time or DTMF encoded, through a media path (146),
   receiving messages (164) from an endpoint, which may be shortened, compressed, limited in time or DTMF encoded, through a media path (146),
   establishing an additional alternative media path, which quality or other metric is evaluated, before using the alternative media path for the media traffic,
   communicating real time using the Session Initiation Protocol, SIP,
   communicating real time using the Web Real Time Communication, WebRTC, protocol,
   establishing media paths between endpoints using the Interactive Connection Establishment, ICE,
   establishing media paths using the Session Traversal Utilities for NAT, STUN protocol, establishing media paths using the Traversal Using Relays around NAT, TURN protocol, storing knowledge, from a self-learning process, whether endpoints or network segments have mutual peer-to-peer media compatibility, generating a WebRTC HTTP URL click-to-call link, that may be time limited and can be stored in a WebRTC server and sent in a shortened form to a WebRTC browser user, executing a WebRTC HTTP URL link, that may be time limited, that is stored in a WebRTC server and received in a shortened form from a WebRTC browser user, identifying a specific domain name extension, e.g., wrtc in wrtc.company.com, in a WebRTC HTTP URL link for invoking WebRTC functionality that otherwise may not be available, organizing contacts in lists based on the call state, in a graphical user interface for RTC clients, representing an expandable action menu for a single contact in a graphical user interface for RTC clients, by the small three vertical dot symbols or the menu lines symbol used in mobile applications, waking up smart phones or other mobile devices to receive incoming calls by push notifications, integrating Private Branch eXchanges, PBX, functionality, integrating Session Border Controller, SBC, functionality, integrating Unified Communications, UC, solution functionality, integrating WebRTC to SIP gateway functionality, integrating call center or contact center functionality, generating context sensitive click-to-call links, executing context sensitive click-to-call links, connecting call agents using WebRTC browsers as clients, providing Instant Messaging, IM, presence, screen sharing and group call functions.

10. The system of claim 3, where user agents coupled to the RTC devices (200) are implemented in the server (210), interconnecting servers (212, 212b) or RTC server (228).

11. The system of claim 10, where the interconnecting servers (212, 212b) use the SIP protocol between each other and SIP user agents coupled to the RTC devices (200) are implemented in the interconnecting servers (212, 212b).

12. The system of claim 3, where the server (210) or interconnecting server (212) is combined with a gateway (222) or intercepting gateway (224).

13. A method for establishing a media path between endpoints for intercepting and decrypting media traffic between an Real Time Communication, RTC, device (200) and an RTC service (228) using a TURN protocol, where the media traffic is protected by encryption against man in the middle attacks using a fingerprint, for monitoring, analyzing and recording purposes, comprising:

providing the RTC device (200) comprising a first media endpoint (202) and a second media endpoint (203) and an RTC server (218) and an intercepting gateway (224), each of the RTC device (200), the second media endpoint (203), the RTC server (218) and the intercepting gateway (224) storing software implementing the method in a memory (192) and a processor (190) coupled to the memory (192);

further comprising:

integrating a TURN server (216) storing software implementing the method in a memory (192) and a processor (190) coupled to the memory (192) with the intercepting gateway (224);

characterized by:

establishing the RTC media path, by the RTC device (200), between the RTC device (200) and the TURN server (216) and, by the RTC device (200), between the TURN server (216) and the second media endpoint (203), and by configuring the RTC device (200) or the RTC service (228) to use the TURN server (216), or by one of the media endpoints (202 or 203) discovering the TURN server (216) in a sealed network segment; and conveying the decryption key for the RTC media traffic to the intercepting gateway (224), by the first media endpoint (202) or by the second media endpoint (203), for decryption of the RTC media traffic passing the intercepting gateway (224);

whereby media traffic is intercepted and decrypted by establishing a media path through an intercepting gateway in a telecommunication service using fingerprint to protect against man in the middle attacks.

14. The method of claims 13, wherein said second endpoint (203) is another RTC device (200) or gateway (222, 224).

15. A system for communication over a network using the method according to claims 13, further comprising two or more RTC endpoints (202, 203, 203b).

16. A telecommunication device implementing a client side of the system of claim 15.

17. A telecommunication device implementing the server side of the system of claim 15, wherein said server side is part of a Session Border Controller, SBC.

18. The telecommunication device implementing the server side of claim 15, wherein said telecommunicating device incorporates a program and can send the program to a client, where the program implements a part of said RTC endpoints.

19. The telecommunication device of claim 18, where said program is on a web server incorporated in the telecommunication device.

20. A software module implementing the client or server side of the system of claim 15 in a web browser or as an application for smart phones, tablets, laptop or personal computers or computer servers, or in a telecommunication device comprising a processor coupled to a memory for executing a program.

21. The software module of claim 20, comprising a program performing a function selected from the group consisting of:

sending messages (164) to endpoints, which may be shortened, compressed, limited in time or DTMF encoded, through a media path (146), receiving messages (164) from an endpoint, which may be shortened, compressed, limited in time or DTMF encoded, through a media path (146), establishing an additional alternative media path, which quality or other metric is evaluated, before using the alternative media path for the media traffic, communicating real time using the Session Initiation Protocol, SIP, communicating real time using the Web Real Time Communication, WebRTC, protocol, establishing media paths between endpoints using the Interactive Connection Establishment, ICE, establishing media paths using the Session Traversal Utilities for NAT, STUN protocol, establishing media paths using the Traversal Using Relays around NAT, TURN protocol, storing knowledge, from a self-learning process, whether endpoints or network segments have mutual peer-to-peer media compatibility, generating a WebRTC HTTP URL click-to-call link, that may be time limited and can be stored in a WebRTC server and sent in a shortened form to a WebRTC browser user, executing a WebRTC HTTP URL link, that may be time limited, that is stored in a WebRTC server and received in a shortened form from a WebRTC browser user, identifying a specific domain name extension, e.g., wrtc in wrtc.company.com, in a WebRTC HTTP URL link for invoking WebRTC functionality that otherwise may not be available, organizing contacts in lists based on the call state, in a graphical user interface for RTC clients, representing an expandable action menu for a single contact in a graphical user interface for RTC clients, by the small three vertical dot symbols or the menu lines symbol used in mobile applications, waking up smart phones or other mobile devices to receive incoming calls by push notifications, integrating Private Branch eXchanges, PBX, functionality, integrating Session Border Controller, SBC, functionality, integrating Unified Communications, UC, solution functionality, integrating WebRTC to SIP gateway functionality, integrating call center or contact center functionality, generating context sensitive click-to-call links, executing context sensitive click-to-call links, connecting call agents using WebRTC browsers as clients, providing Instant Messaging, IM, presence, screen sharing and group call functions.

22. The method of claim 13, where user agents coupled to the RTC devices (200) are implemented in the server (210), interconnecting servers (212. 212b) or RTC server (228).

23. The method of claim 22, where the interconnecting servers (212, 212b) use the SIP protocol between each other and SIP user agents coupled to the RTC devices (200) are implemented in the interconnecting servers (212. 212b).

24. The method of claim 13, where the server (210) or interconnecting server (212) is combined with a gateway (222) or intercepting gateway (224).

* * * * *